US011165839B2

(12) United States Patent
Nixon et al.

(10) Patent No.: US 11,165,839 B2
(45) Date of Patent: Nov. 2, 2021

(54) EDGE GATEWAY SYSTEM WITH DATA TYPING FOR SECURED PROCESS PLANT DATA DELIVERY

(71) Applicant: FISHER-ROSEMOUNT SYSTEMS, INC., Round Rock, TX (US)

(72) Inventors: Mark J. Nixon, Round Rock, TX (US); Claudio Fayad, Austin, TX (US); Robert G. Halgren, III, Austin, TX (US); Gary K. Law, Georgetown, TX (US); John M. Caldwell, Austin, TX (US); Anthony Amaro, Jr., Cedar Park, TX (US); Peter Hartmann, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 33 days.

(21) Appl. No.: 16/577,679

(22) Filed: Sep. 20, 2019

(65) Prior Publication Data

US 2021/0092173 A1 Mar. 25, 2021

(51) Int. Cl.
*G06F 15/16* (2006.01)
*G06F 9/54* (2006.01)
(Continued)

(52) U.S. Cl.
CPC ...... *H04L 65/4069* (2013.01); *G05B 19/4185* (2013.01); *H04L 12/66* (2013.01);
(Continued)

(58) Field of Classification Search
CPC .................................................. H04L 65/4069
(Continued)

(56) References Cited

U.S. PATENT DOCUMENTS 10,069,726 B1 * 9/2018 Ahrenholz ............. H04L 45/64
10,257,163 B2 * 4/2019 Rotvold ............. H04L 63/0209
(Continued)

OTHER PUBLICATIONS

De Freitas M.B., Rosa L., Cruz T., Simões P. (2019) SDN-Enabled Virtual Data Diode. In: Katsikas S. et al. (eds) Computer Security . SECPRE 2018, CyberICPS 2018. Lecture Notes in Computer Science, vol. 11387. Springer, Cham. https://doi.org/10.1007/978-3-030-12786-2_7 (Year: 2019).*

(Continued)

*Primary Examiner* — Hamza N Algibhah
(74) *Attorney, Agent, or Firm* — Marshall, Gerstein & Borun LLP

(57) ABSTRACT

An edge gateway system securely delivers and exposes data generated by and/or related to a process plant for consumption by external systems, and includes a field-facing component that sends, to an edge-facing component of the system, a collection of data types defined based on configurations of the process plant and represented using a syntax that is native to the one or more external systems. The field-facing component streams process plant-related content data indicated by one or more interest lists to the edge-facing component, where the streamed data is expressed using the collection of data types. Each interest list may include multiple types of data (e.g., control, I/O, diagnostic, device, historical, etc.) that collectively represent a particular named entity of the plant. Accordingly, the streamed data is securely delivered and exposed, via the edge-facing component, to the external systems.

22 Claims, 7 Drawing Sheets

(51) Int. Cl.
*H04L 29/06* (2006.01)
*G05B 19/418* (2006.01)
*H04L 29/08* (2006.01)
*H04L 12/66* (2006.01)

(52) U.S. Cl.
CPC .......... *H04L 63/0428* (2013.01); *H04L 67/26* (2013.01); *G05B 2219/31348* (2013.01)

(58) Field of Classification Search
USPC ......................................................... 709/217
See application file for complete search history.

(56) References Cited

U.S. PATENT DOCUMENTS

| | | | | |
|---|---|---|---|---|
| 10,270,745 | B2* | 4/2019 | Rotvold | ................ H04L 9/0869 |
| 10,481,812 | B2* | 11/2019 | Endo | ....................... G06F 21/85 |
| 2008/0201770 | A1* | 8/2008 | Okamoto | ................ G06F 21/31 |
| | | | | 726/7 |
| 2014/0156381 | A1* | 6/2014 | Monsees | ............ G06Q 30/0255 |
| | | | | 705/14.43 |
| 2015/0089354 | A1* | 3/2015 | Abrahami | ............. G06F 16/958 |
| | | | | 715/235 |
| 2017/0373974 | A1* | 12/2017 | Wood | .................... H04L 45/306 |
| 2018/0052628 | A1* | 2/2018 | Endo | ........................ G06F 3/061 |
| 2018/0115516 | A1* | 4/2018 | Rotvold | .................. H04L 63/10 |
| 2018/0115517 | A1* | 4/2018 | Rotvold | ................ H04L 63/061 |
| 2020/0092313 | A1* | 3/2020 | Yamaguchi | ......... H04L 63/0245 |

OTHER PUBLICATIONS

Using Bi-directional Data Diodes to Limit Propagation of Network Attacks Master's thesis in Information Security Supervisor: Prof. Slobodan Petrovic (Year: 2019).*
"Display Design Handbook—Refining Edition," Center for Operator Performance (2018).
NOA—NAMUR Open Architecture (2017).
Wang et al., "An Industrial IoT System Design for Large-Scale Continuous Condition Monitoring," Proceedings of the IEEE (2018).

* cited by examiner

312a
MODE               TARGET      ENUM
                   ACTUAL      ENUM
                   PERMITTED   ENUM
                   NORMAL      ENUM

FUNCTION_BLOCK_DEFINITION NAME="CEM"
CATEGORY="Library/FunctionBlockTemplates/Advanced Functions"
{
 DESCRIPTION="Cause Effect Matrix"
 APPLICABILITY=CONTROLLER
 UI_STRING="Cause Effect Matrix"
 LICENSE_LEVEL=CALCS
 CONNECT_NODE_LICINSE { BASE="??" REDUNDANT="??" }
 REQUIRE_CAPABILITY { NAME= "STG_CONTROL" }
 NVM_SIZE=82
 ATTRIBUTE NAME= "CEM_ALERTS" TYPE=OPTION_BITSTRING
 {
  INDEX=1361
  CONNECTION=INTERNAL
  READONLY=T
  EDITABLE=F
  CONFIGURABLE=F
  STANDARD_GROUP=ALARM
  HELP_ID=337874
  CATEGORY { CATEGORY=ONLINE }
  CATEGORY { CATEGORY=INVALID_ON_REMOTEIO }
  CATEGORY { CATEGORY=SIS_ACCESS }
 }
 ATTRIBUTE_VALUE NAME= "CEM_ALERTS"
 {
  SET= "$cem_alerts"
  MASK0=T
  MASK1=T
    .
    .
    .

ENUMERATION_SET NAME="$discrete_hart_states" FIXED=T user= "hawkbuild" time=1474872774/" "26-Sep-2016 01:52:54" "/

{

DESCRIPTION="Discrete HART States"

CATEGORY="Named Sets"

ENTRY VALUE=0 NAME="Off" { }

ENTRY VALUE=1 NAME="On" { }

⋮

ENTRY VALUE=54 NAME="High" { }

ENTRY VALUE=55 NAME="Low" { }

ENTRY VALUE=240 NAME="False" { }

ENTRY VALUE=241 NAME="Transition" { }

ENTRY VALUE=242 NAME="True" { }

ENTRY VALUE=243 NAME="Fault" { }

ENTRY VALUE=244 NAME="MfgSpecific4" { SELECTABLE=F VISIBLE=F }

ENTRY VALUE=245 NAME="MfgSpecific5" { SELECTABLE=F VISIBLE=F }

ENTRY VALUE=246 NAME="MfgSpecific6" { SELECTABLE=F VISIBLE=F }

ENTRY VALUE=247 NAME="MfgSpecific7" { SELECTABLE=F VISIBLE=F }

ENTRY VALUE=248 NAME="MfgSpecific8" { SELECTABLE=F VISIBLE=F }

ENTRY VALUE=249 NAME="MfgSpecific9" { SELECTABLE=F VISIBLE=F }

ENTRY VALUE=250 NAME="Not Communicating" { SELECTABLE=F }

ENTRY VALUE=254 NAME="Bad" { SELECTABLE=F }

ENTRY VALUE=255 NAME="Undefined" { SELECTABLE=F VISIBLE=F }

DEFAULT_VALUE=0

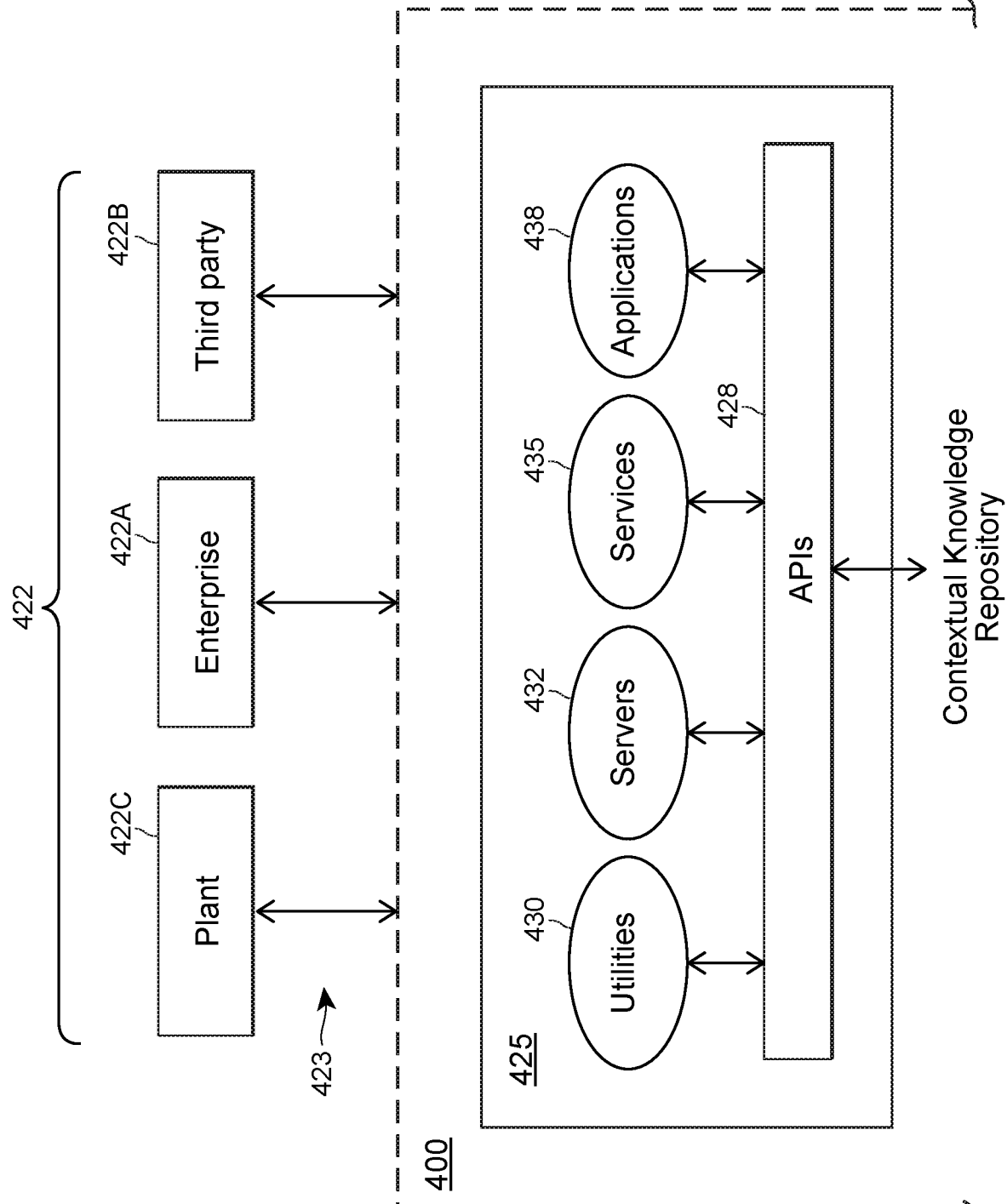

EDGE GATEWAY SYSTEM WITH DATA TYPING FOR SECURED PROCESS PLANT DATA DELIVERY

RELATED REFERENCES

The present disclosure is related to co-owned U.S. patent application Ser. No. 15/332,622, filed Oct. 24, 2016 and entitled "Publishing Data Across a Data Diode for Secured Process Control Communications;" co-owned U.S. patent application Ser. No. 15/332,690, filed Oct. 24, 2016 and entitled "Securely Transporting Data Across a Data Diode for Secured Process Control Communications," which issued as U.S. Pat. No. 10,270,745; and co-owned U.S. patent application Ser. No. 15/332,751, filed Oct. 24, 2016 and entitled "Secured Process Control Communications," which issued as U.S. Pat. No. 10,257,163, the entire disclosures of which are hereby incorporated by reference herein.

The present disclosure is also related to co-owned U.S. patent application Ser. No. 16/577,800, filed on Sep. 20, 2019 and entitled "Edge Gateway System with Contextualized Process Plant Knowledge Repository"; and co-owned U.S. patent application Ser. No. 16/577,664, filed on Sep. 20, 2019 and entitled "Edge Gateway System for Secured, Exposable Process Plant Data Delivery," the entire disclosures of which are incorporated by reference herein.

TECHNICAL FIELD

The present disclosure relates generally to process plants and to process control systems, and more particularly, to securing the delivery of process plant-related data from process plants/process control systems to external systems that utilize or consume process plant-related data.

BACKGROUND

Distributed process control systems, like those used in chemical, petroleum, pharmaceutical, paper product processing, or other process plants, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters such as pressure, temperature, etc., and the like to control one or more process executing within the process plant or system. Smart field devices, such as the field devices conforming to the well-known Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Automation Solutions, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Generally speaking, a process control system of a process plant includes field devices, controllers, workstations, and other devices that are interconnected by a set of layered networks and buses. The process control system may, be in turn, be connected with various business and external networks, e.g., to reduce manufacturing and operational costs, enhance productivity and efficiencies, provide timely access to process control and/or process plant information, etc. On the other hand, the interconnection of process plants and/or process control systems to enterprise and/or external networks and systems increases the risk of cyber intrusions and/or malicious cyber attacks that may arise from expected vulnerabilities in commercial systems and applications, such as those used in enterprise and/or external networks. Cyber intrusions and malicious cyber attacks of process plants, networks, and/or control systems may negatively affect the confidentiality, integrity, and/or availability of information assets, which, generally speaking, are vulnerabilities similar to those of general purpose computing networks. However, unlike general purpose computer networks, cyber intrusions of process plants, networks, and/or control systems may also lead to damage, destruction, and/or loss of not only plant equipment, product, and other physical assets, but also to the loss of human life. For example, a cyber intrusion may cause a process to become uncontrolled, and thereby produce explosions, fires, floods, exposure to hazardous materials, etc. Thus, securing communications related to process control plants and systems is of paramount importance.

SUMMARY

In an embodiment, a method of securely delivering, from a process plant via an edge gateway system, data related to the process plant for consumption by one or more external disclosed. The edge gateway system includes a field-facing component and an edge-facing component interconnected by a data diode, and the method includes sending, by the field-facing component to the edge-facing component via the data diode, a collection of data types corresponding to data that is related to an industrial process being controlled by the process plant and that is allowed to be exposed to the one or more external systems. The data diode may be a unidirectional data diode configured to prevent any flow of both signaling and payload data from the edge-facing component to the field-facing component, and the collection of data types is defined based on one or more configurations of the process plant and represented using a syntax that is native to the one or more external systems. The method further includes streaming, by the field-facing component across the data diode to the edge-facing component, content data generated by the process plant, where the content data is indicated by one or more interest lists corresponding to the field-facing component, and the content data is expressed within the stream using the collection of data types. Accordingly, via the method, the streamed content data generated by the process plant is made available for consumption by the one or more external systems via the edge-facing component.

BRIEF DESCRIPTION OF THE DRAWINGS

FIGS. 4A-4C depict example data types of an example exposable data type system generated by a field-facing component of an edge gateway system for a process plant or process control system.

FIG. 5B is a block diagram of a second portion of the edge-facing component of FIG. 5A.

DETAILED DESCRIPTION

Securing process plants and process control systems against cyber intrusions and malicious cyber attacks typically utilizes a layered or leveled security hierarchy, with at least some of the layers or levels secured by using firewalls and other security mechanisms. Using the Purdue Model for Control Hierarchy logical framework standardized by ISA (International Society of Automation) 95.01-IEC (International Electrotechnical Commission) 62264-1 as an example framework, process control systems generally fall into security levels 0-2 (e.g., OT (Operational Technology) levels that have a higher level of trust in the safety and validity of messages, packets, and other communications), and manufacturing, corporate, and enterprise systems generally fall into security levels 3-5 (e.g., IT (Informational Technology) levels that have a lower level of trust). For example, process plant systems, networks, and devices at security levels 0-3 may be protected against threats from enterprise networks at security levels 4-5, and/or from any external networks higher than security level 5 exploiting the enterprise networks, e.g., by using a demilitarized zone (DMZ) and/or one or more firewalls. However, as more and more services and applications that operate on process plant data are moved to execute remotely, e.g., on networks and systems outside of or external to the process plant (e.g., at security levels 4 and/or 5 within the enterprise or business with which the process plant is associated, owned, and/or operated), and/or even on networks and systems that are external to the enterprise or business (e.g., above security level 5, via the Internet or other public network), stronger techniques for preventing process plant systems, networks, and devices from being compromised are needed.

The novel systems, components, apparatuses, methods, and techniques described herein address these and other security issues related to process plants and their networks, and in particular are directed to the secure delivery of process plant-related data to one or more external systems that are consumers of the process plant-related data.

Figure 1:
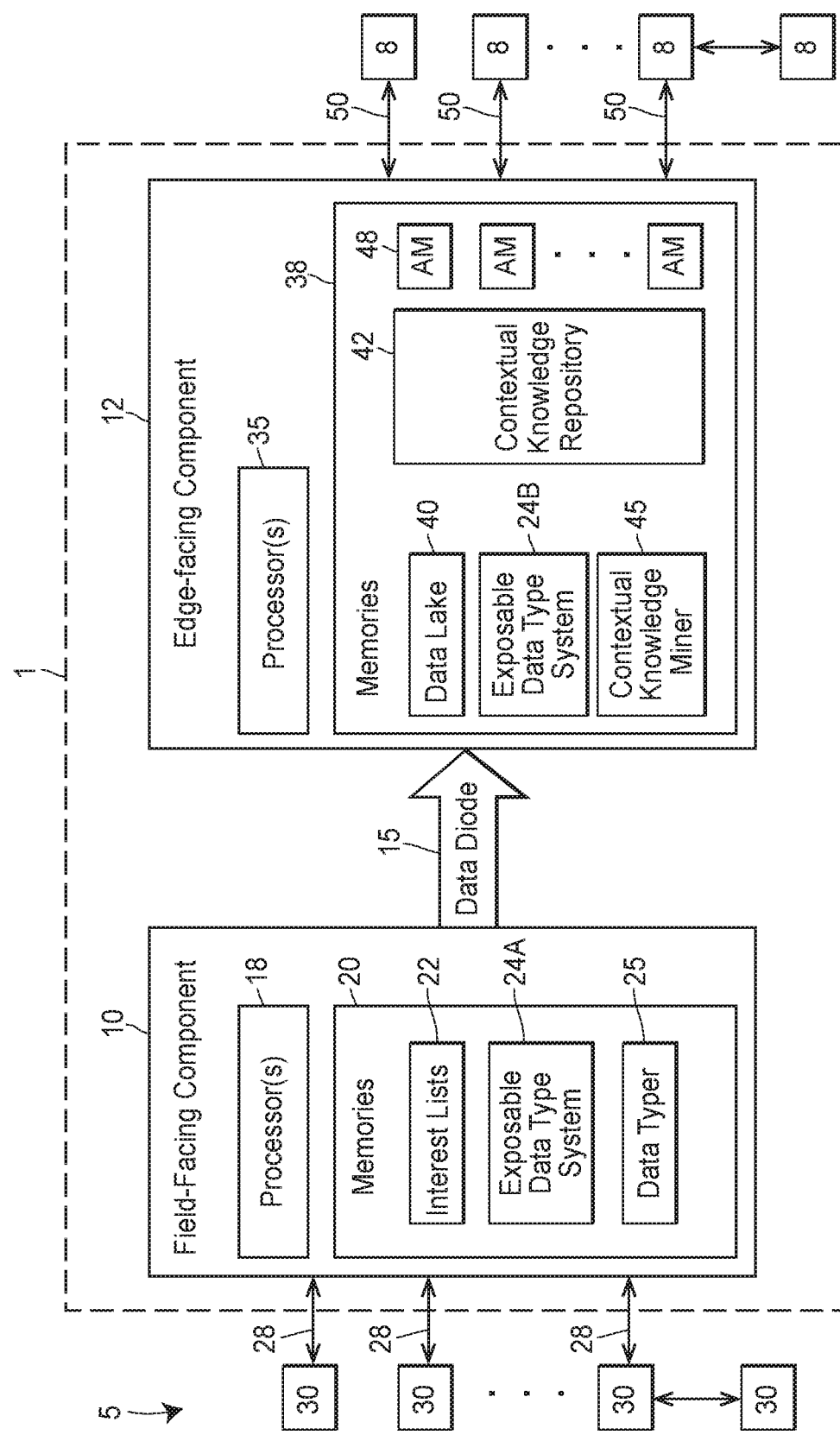
FIG. 1 is a block diagram of an example edge gateway system for an industrial process plant.

To illustrate, FIG. 1 is a block diagram of an example edge gateway system 1 which securely delivers process plant-related data (e.g., field data) from a process plant 5 to one or more external, data-consuming applications and/or systems, which may include enterprise applications and/or systems (e.g., at IT levels of security, such as security levels 3-5), and/or third-party applications and/or systems. The edge gateway system 1 includes a field-facing component 10 that is communicatively connected to an edge-facing component 12 via a data diode 15. The field-facing component 10 includes one or more processors 18 and one or more non-transitory memories or data storage devices 20 storing at least one set of data and at least one set of computer-executable instructions, where the at least one set of computer-executable instructions are executable by the one or more processors 18. For example, as illustrated in FIG. 1, the one or more memories 20 of the field-facing component 10 store respective data sets such as one or more interest lists 22, an exposable data type system 24A, and optionally other data sets (not shown). The one or more memories 20 of the field-facing component 10 further store computer-executable instructions for a data typer 25, and may store other sets of computer-executable instructions (not shown). The field-facing component 10 is communicatively connected to one or more process plant communications networks, data networks, and/or links 28, which may include any number of wired and/or wireless communications networks, data networks, and/or links that communicatively connect various devices and/other data sources 30 which are associated with the process plant 5 and which generate data, e.g., while the process plant 5 is operating to control an industrial process. More detailed descriptions of embodiments of the field-facing component 10 of the edge gateway system 1 and its subcomponents are provided elsewhere within this disclosure.

The edge-facing component 12 of the edge gateway system 1 includes one or more processors 35 and one or more non-transitory memories or data storage devices 38 storing at least one set of data and at least one set of computer-executable instructions, where the at least one set of computer-executable instructions are executable by the one or more processors 35. For example, as illustrated in FIG. 1, the one or more memories 38 of the edge-facing component 12 store at least a partial copy 24B of the exposable data type system 24A of the field-facing component 10, respective data sets corresponding to a data lake 40 and a contextual knowledge repository 42, and the one or more memories 38 of the edge-facing component 12 store respective computer-executable instructions for a contextual knowledge miner 45 and one or more access mechanisms 48 for the contextual knowledge repository 42. Of course, although not shown in FIG. 1, the one or more memories 38 of the edge-facing component 12 may store other sets of data and/or other sets of computer-executable instructions. As also illustrated in FIG. 1, the edge facing component 12 of the edge gateway system 1 is communicatively connected to one or more external, data-consuming systems 8 via one or more external communications networks, data networks, and/or links 50. The one or more external communications networks, data networks, and/or links 50 may include any number of wired and/or wireless communications networks, data networks, and/or links, and may include any number of private and/or public networks and/or links. The one or more external systems 8 may include any number of public computing systems and/or private computing systems, which may be respectively implemented using any suitable technology, such as banks of servers, cloud computing systems, and the like, and on which various applications (e.g., third-party applications, websites, etc.) may execute. More detailed descriptions of embodiments of the edge-facing component 12 and its subcomponents are provided elsewhere within this disclosure.

As shown in FIG. 1, the field-facing component 10 and the edge-facing component 12 are interconnected via a data diode 15 (although in some implementations of the edge gateway system 1 (not shown), the data diode 15 may be omitted and the field-facing component 10 and the edge-facing component 12 are in direct connection, or are an integral, unitary logical and/or physical component). At any rate, as shown in FIG. 1, the data diode 15 includes one or more transmission media via which data (e.g. electronic data) is transported from the field-facing component 10 to the edge-facing component 12, where the data diode 15 is the only communicative connection between the field-facing component 10 and the edge-facing component 12. In a preferred embodiment, the data diode 15 is unidirectional, so that any and all types of data (e.g., signaling data, control data, administrative data, payload data, etc.) flows only from the field-facing component 10 to the edge-facing component 12, and does not flow (and indeed, in some embodiments, is not physically able to flow) from the edge-facing component 12 to the field-facing component 10. That is, the data diode 15 may be physically and/or logically configured to prevent any and all types of data (e.g., signaling data, control data, administrative data, payload data, etc.) from flowing from the edge-facing component 12 to the field-facing component 10. In an example, the unidirectional data diode 15 is implemented using an optical fiber link or cable, or some other suitable type of high-bandwidth hardware and/or software transmission media such as, e.g., an Ethernet link, a wireless data diode, a software-defined data diode, etc. In another example, hardware and/or software of the unidirectional data diode 15 may be otherwise configured to prevent the flow of any type of data (e.g., signaling data, control data, administrative data, payload data, etc.) from the edge-facing component 12 the field-facing component 10, while supporting the flow of data from the field-facing component 10 to the edge facing component 12. For instance, physical ports of the edge-facing component 12 that would otherwise receive data from the one or more external systems 8 may be blocked, disabled, and/or omitted.

For additional security, data that is transported from the field-facing component 10 to the edge-facing component 10 across the data diode 15 may be encrypted by the field-facing component 10 and decrypted by the edge-facing component 12. Further, for efficiencies, the data diode 15 is configured to support high-throughput data streaming, such as at a rate of 100K parameters per second or higher. Indeed, in some embodiments, the data diode 15 may operate at a rate of 1 Gigabit per second or higher. For example, the data diode 15 may be implemented using an optical fiber link or cable, or some other suitable type of high-bandwidth hardware and/or software transmission media such as, e.g., an Ethernet link, a wireless data diode, a software-defined data diode, etc., to support the high-throughput data streaming capabilities. Such high-bandwidth hardware and/or software transmission media may be implemented with unidirectional transmit capabilities and without any receive capabilities, with respect to the field-facing component 10, to thereby further enforce only one-way, unidirectional data transmissions from the field-facing component 10 to the edge-facing component 12. Still further, the data diode 15 is easily scalable to accommodate system growth. For example, multiple cores and/or multiple threads may be added and/or utilized to support system growth and the corresponding growth in the amounts and rates of data that is transported from the field-facing component 10 to the edge-facing component 12.

Generally speaking, the edge gateway system 1 securely connects and/or bridges the process plant 5 and associated systems at lower-numbered security levels with one or more data-consuming systems 8 at higher-numbered security levels. For example, with reference to the Purdue Model (or other similar security hierarchy), the data sources 30 and the networks/links 28 via which the edge gateway system 1 obtains process-plant related data may be at lower-numbered security levels (e.g., security level 0 through security level 2), and may include, for example, process control systems, safety instrumented systems, configuration systems, analytics systems, communication/networking systems, asset management systems, diagnostic and/or testing tools and/or systems, commissioning tools and/or systems, user devices and/or operator interfaces, historian systems, batch systems, software defined networks, virtual networks such as virtual private networks, Virtual Local Area Networks (VLANs), and/or Virtual Extensible Local Area Networks (VXLANs), and other systems, networks, applications, and/or devices associated with the process plant 5. Accordingly, for ease of discussion herein, and not for limitation purposes, the term "process plant 5" is used to collectively refer to the physical process plant as well as to other systems associated with and in communicative connection with the physical process plant that generate and/or communicate data of lower-numbered levels of security.

At the edge gateway system 1 of FIG. 1, the field-facing component 10 that obtains and initially processes the process plant-related data (e.g., field data) generated by the process plant 5 may be at security level 2 to security level 3, and the data diode 15 and edge-facing component 12 may be at security level 3. The one or more external, data-consuming systems 8 may be at security level 4 or higher, and may include any number of public and/or private systems and various applications executing thereon, such as enterprise applications and/or systems, third-party applications and/or systems, publicly-available applications and/or systems, websites, etc. As such, the edge gateway system 1 securely delivers field data generated by the process plant and its related systems, networks, and/or applications 5 at lower-numbered levels of security to systems, networks, and/or applications 8 at higher-numbered levels of security.

In particular, as shown in FIG. 1, the field-facing component 10 of the edge gateway system 1 obtains or collects field data from data sources 30 in accordance with one or more interest lists 22 stored at the field-facing component 10. Interest lists 22 indicate specific process plant-related or field data that is generated by the process plant 5 in relation to the plant 5 operating to control an industrial process, wherein the indicated process plant-related of field data is allowed to be exposed (e.g., is exposable) to the external systems, networks, and/or applications 8. As such, interest lists 22 included in the edge gateway system 1 provide an initial level of field-facing security against protected field data being inadvertently released from the process plant 5 to external, data-consuming systems 8. Interest lists 22 may indicate specific field data of interest and/or combinations thereof, such as specific runtime data, event data, historical data, configuration data, and/or any other type of process plant-related data that is generated by devices, components, and/or systems of and/or related to the process plant 5 at lower-numbered levels of security (e.g., at security levels 0-2). Interest lists 22 may be configured and/or defined via an interest manager (not shown in FIG. 1), which is described in more detail elsewhere within this disclosure.

Further, at the field-facing component 10, the data typer 25 respectively types obtained interest list data content in accordance with the exposable data type system 24A. Generally speaking, the exposable data type system 24A defines or configures a system of data types (including data definitions, names, values, fields, structures, classes, objects, etc.) that are exposed or otherwise made available to the external, data-consuming systems 8. Additionally, the exposable data system 24A defines names, mappings, conversions, groupings, value assignments, and/or other arrangements of process plant-related or field data types into the exposable data types so that process plant-related data content may be utilized and understood by the external, data-consuming systems 8. The term "process plant-related data types" or "field data types," as interchangeably utilized herein, generally refers to data types (e.g., data definitions, names, values, fields, structures, classes, objects, etc.) that have been defined and/or configured for use by applications, devices, components, systems, and/or networks of the process plant 5 and its associated systems at lower-numbered levels of security. In an embodiment, the exposable data type system 24A may be defined or configured via an Interest Manager (e.g., in a manner such as described elsewhere within this disclosure). At any rate, the exposable data system 24A allows the external systems 8 to interpret process plant-related/field data that is generated by the process plant 5 and associated lower security level systems without the external systems 8 needing to be aware of any internal data definitions and/or configurations of the plant 5, and without having to query and/or initiate communications with and/or send responses to the process plant 5. As such, the exposable data type system 24A and data typer 25 of the edge gateway system 1 further protect the process plant 5 from possible security breaches from external systems 8. The exposable data type system 24A and the data typer 25 are described in more detail elsewhere in this disclosure.

At least due to the use of the exposable data type system 24A and the data typer 25, the data diode 15 may be a truly unidirectional data diode. Currently known data diodes provide for unidirectional flow of content data, but allow for bi-directional flow of signaling, control, and/or administrative data, such by allowing acknowledgements and/or error conditions to be communicated from a data-receiving end to the data-sending end. However, the data diode 15 of the edge gateway system 1 may be truly unidirectional in that no types of data flow from its data-receiving end to its data-sending end. Indeed, in embodiments, the data diode 15 is physically configured to prevent any type of data (e.g., signaling, control, administrative, content, etc.) from being delivered from the edge-facing component 12 to the field-facing component 10, e.g., such as in embodiments in which the data diode 15 is implemented via optical transmission media. As such, due to at least the truly unidirectional nature of the data diode 15, the data diode 15 of the edge gateway system 1 still further protects the process plant 5 from possible security breaches from the external systems 8.

At the edge-facing component 12 of the edge gateway system 1, the typed, field content data that is received from the field-facing component 10 via the data diode 15 is stored in the data lake 40. The contextual knowledge miner 45 mines the data lake 40 to discover relationships and associations between various field content data stored in the data lake 40, and generates/modifies/updates the contextual knowledge repository 48 so that the contextual knowledge repository 48 includes indications of both the received field content data as well as the discovered relationships and/or associations (e.g., contexts of the received field content data). As such, the contextual knowledge repository 48 stores both process plant-related or field content data (e.g., run-time data, event data, historical data, and/or other types of data provided by the process plant 5, as well as contextual information that is indicative of relationships between provided process plant-related/field content data, conditions corresponding to the generation, delivery, and/or reception of the process plant-related/field content data within the process plant 5, and/or other types of contexts of the process plant-related/field content data. Knowledge (e.g., content data and associated contextual information, and optionally other data) that is stored in the contextual knowledge repository 48 is exposable (e.g., is made available) to the one or more external, data-consuming systems 8.

Indeed, the edge-facing component 12 provides one or more access mechanisms 48 via which the external, data-consuming systems 8 may access at least some of the knowledge stored in the contextual knowledge repository 48. Each access mechanism may respectively include yet another level of protection against possible security breaches from the external systems 8. For example, access mechanisms 48 may be implemented using application programming interfaces (APIs), containers, etc. to aid in preventing external systems from unauthorized access of the contextual knowledge repository 48 and/or of the process plant 5. In embodiments, at least one of the access mechanisms 48 may be include a respective server or a protected application executing at the edge-facing component 12, such as a search engine, where a specific access mechanism for the server or private application (e.g., such as server-specific or application-specific API) is exposed to the external systems 8 for their use. The edge-facing component 12 of the edge gateway system 1 and its subcomponents are discussed in more detail elsewhere in this disclosure.

Generally speaking, the features, components, and architecture of the edge gateway system 1 provide almost unlimited access of external, data-consuming systems 8 to process plant-related data in a highly secure manner and without impacting the performance of the process plant 5. Additionally, as the edge gateway system 1 contextually provides process plant-related data to the external systems 8, e.g., provides process plant-related content data within the context of the configuration of the process plant 5, external systems 8 may more quickly and easily find and consume process-plant related data. Further, the edge gateway system 1 allows for a multiplicity of different types of data-consuming applications to safely and easily operate on the contextual knowledge corresponding to the process plant 5, such as mobile connectivity applications, advanced analytical applications, open-systems technology applications (e.g., Node.JS, Docker, Linux, etc.), custom applications, IoT applications, IIoT applications, business and/or enterprise applications (e.g., Excel, Power BI, etc.), and/or other types of applications. Still further, the edge gateway system 1 is easily adaptable to aggregate process plant-related data from multiple process plants and discover related aggregated knowledge therefrom, as well as to aggregate data from external systems at higher-numbered levels of security (such as weather forecasting systems, supply chain systems, financial systems, inventory management systems, etc.) and discover related aggregated knowledge therefrom.

It is noted that although FIG. 1 illustrates the edge gateway system 1 as including a single field-facing component 10 that is communicatively connected with the edge-facing component 12 via a unidirectional data diode 15, this is only one of many possible arrangements. For example, in some embodiments, the field-facing component 10 and the edge-facing component 12 may be implemented as an integral component within the edge gateway system 1, and the data diode 15 may be omitted. In some embodiments, the field-facing component 10 and the data diode 15 may be implemented an integral component of the edge gateway system 1, or the data diode 15 and the edge-facing component 12 may be implemented as an integral component. In some embodiments, multiple instances of the data diode 15 may be included in the edge gateway system 1, such as when an integral field-facing component 10/data diode instance 15 is communicatively connected to an integral data diode instance 15/edge-facing component 12. In other embodiments, the edge gateway system 1 may include a single edge-facing component 12 that is communicatively connected to multiple field-facing components 10 via respective data diodes 15. In these embodiments, the edge gateway system 1 may service an entire process plant site, where site-wide data may be aggregated at the edge-facing component 12 and operated on by various applications, such as monitoring applications, analytics applications, reporting applications, display applications, and the like. The single edge-facing component 12 and multiple field-facing components 10 configuration may be equally useful to service multiple process plant sites across an enterprise, multiple process control systems, and/or other distributed configurations.

Process Plant and Related Data Sources

Figure 2:
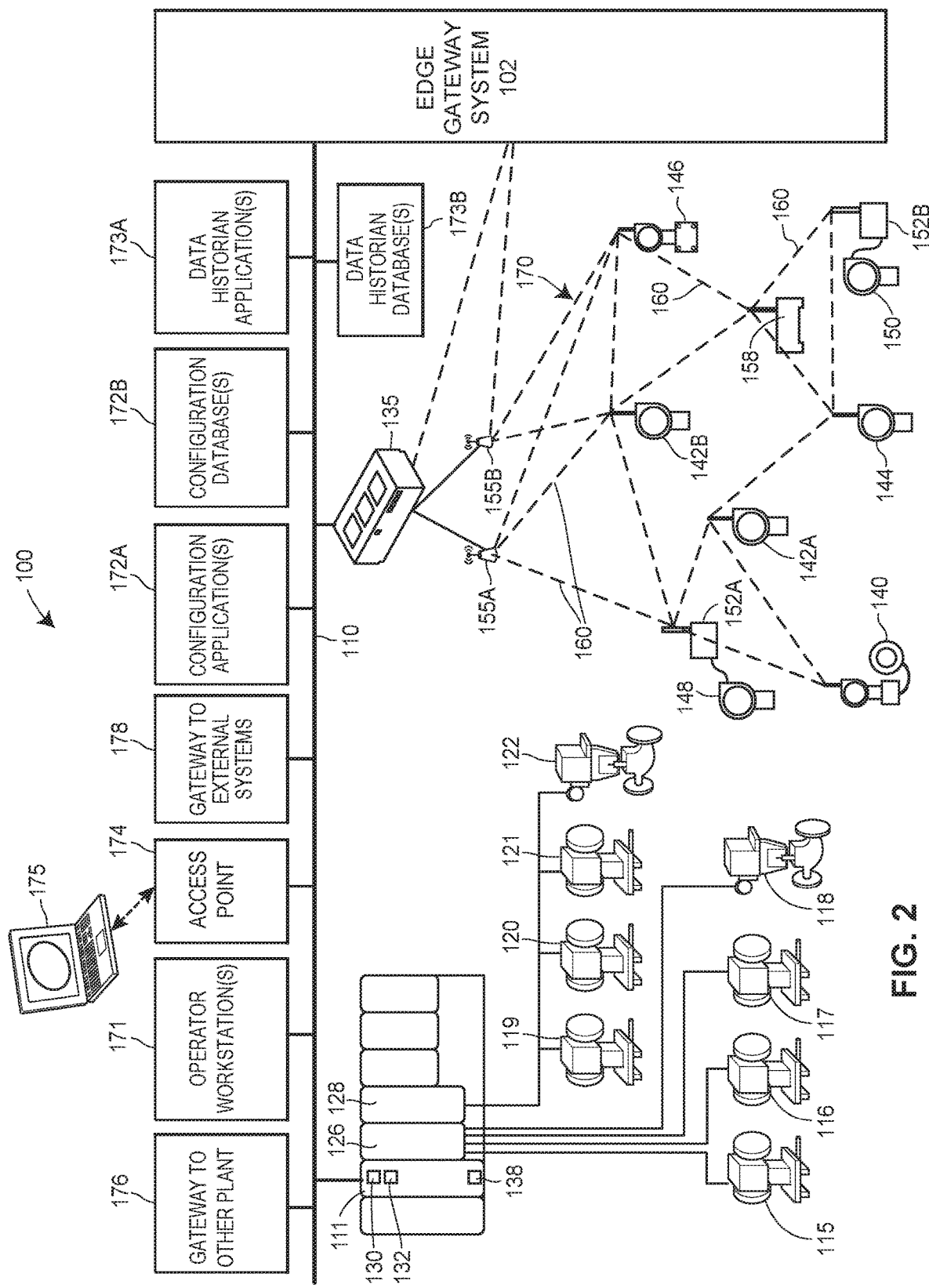
FIG. 2 is a block diagram of an example industrial process plant that illustrates, inter alia, interconnections between various example components of the process plant or process control system, the process control system itself, and other example associated systems and/or networks at similar levels of security as the process plant.

FIG. 2 is a block diagram of an example process plant 100 which is configured to control an industrial process during on-line or run-time operations, and from which process plant-related may be securely delivered via embodiments of the edge gateway system 1. For example, the process plant 5 of FIG. 1 may include at least portions of the process plant 100 of FIG. 2. As shown in FIG. 2, the process plant 100 is communicatively connected to an edge gateway system 102, which may be an embodiment of the edge gateway system 1 of FIG. 1, for example.

The process plant 100 (which is also interchangeably referred to herein as a process control system 100 or process control environment 100) includes one or more process controllers that receive signals indicative of process and/or other types of measurements made by field devices, process this information to implement a control routine, and generate control signals that are sent over wired or wireless process control communication links or networks to other field devices to control the operation of an industrial process in the plant 100. Typically, at least one field device performs a physical function (e.g., opening or closing a valve, increasing or decreasing a temperature, taking a measurement, sensing a condition, etc.) to control the operation of the process. Some types of field devices communicate with controllers by using I/O devices and/or I/O electronic marshalling devices, hubs, servers, or systems. Process controllers, field devices, and I/O devices may be wired or wireless, and any number and combination of wired and wireless process controllers, field devices and I/O devices may be included in the process plant environment or system 100.

For example, FIG. 2 illustrates a process controller 111 that is communicatively connected to wired field devices 115-122 via input/output (I/O) cards 126 and 128, and that is communicatively connected to wireless field devices 140-146 via a wireless gateway 135 and a process control data highway or backbone 110. The process control data highway 110 may include one or more wired and/or wireless communication links, and may be implemented using any desired or suitable or communication protocol such as, for example, an Ethernet protocol, an IP or other packet protocol, etc. In some configurations (not shown), the controller 111 may be communicatively connected to the wireless gateway 135 using one or more communications networks other than or in addition to the backbone 110, such as by using any number of other wired or wireless communication links that support one or more communication protocols, data protocols, and/or industrial automation protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, HART-IP, other packet protocols, streaming protocols, Profibus, FOUNDATION® Fieldbus, etc.

The controller 111, which may be, by way of example, the DeltaV controller sold by Emerson Automation Solutions, may operate to implement a batch process or a continuous process using at least some of the field devices 115-122 and 140-146. In an embodiment, in addition to being communicatively connected to the process control data highway 110, the controller 111 is also communicatively connected to at least some of the field devices 115-122 and 140-146 using any desired hardware and software associated with, for example, standard 4-20 mA devices, I/O cards 126, 128, and/or any smart communication protocol such as the FOUNDATION® Fieldbus protocol, the HART® protocol, the WirelessHART® protocol, etc. In FIG. 2, the controller 111, the field devices 115-122 and the I/O cards 126, 128 are wired devices, and the field devices 140-146 are wireless field devices. Of course, the wired field devices 115-122 and wireless field devices 140-146 could conform to any other desired standard(s) or protocols, such as any wired or wireless protocols, including any standards or protocols developed in the future.

The process controller 111 of FIG. 2 includes a processor 130 that implements or oversees one or more process control routines 138 (e.g., that are stored in a memory 132). The processor 130 is configured to communicate with the field devices 115-122 and 140-146 and with other nodes that are communicatively connected to the controller 111. It should be noted that any control routines or modules described herein may have parts thereof implemented or executed by different controllers or other devices if so desired. Likewise, the control routines or modules 138 described herein which are to be implemented within the process control system 100 may take any form, including software, firmware, hardware, etc. Control routines may be implemented in any desired software format, such as using object oriented programming, ladder logic, sequential function charts, function block diagrams, or using any other software programming language or design paradigm. The control routines 138 may be stored in any desired type of memory 132, such as random access memory (RAM), or read only memory (ROM) Likewise, the control routines 138 may be hard-coded into, for example, one or more EPROMs, EEPROMs, application specific integrated circuits (ASICs), or any other hardware or firmware elements. Thus, the controller 111 may be configured to implement a control strategy or control routine in any desired manner.

The controller 111 implements a control strategy using what are commonly referred to as function blocks, where each function block is an object or other part (e.g., a subroutine) of an overall control routine and operates in conjunction with other function blocks (via communications called links) to implement process control loops within the process control system 100. Control based function blocks typically perform one of an input function, such as that associated with a transmitter, a sensor or other process parameter measurement device; a control function, such as that associated with a control routine that performs PID, fuzzy logic, etc. control; or an output function which controls the operation of some device, such as a valve, to perform some physical function within the process control system 100. Of course, hybrid and other types of function blocks exist. Function blocks may be stored in and executed by the controller 111, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 111 may include one or more control routines 138 that may implement one or more control loops which are performed by executing one or more of the function blocks.

The wired field devices 115-122 may be any types of devices, such as sensors, valves, transmitters, positioners, etc., while the I/O cards 126 and 128 may be any types of I/O devices conforming to any desired communication or controller protocol. In FIG. 2, the field devices 115-118 are standard 4-20 mA devices or HART® devices that communicate over analog lines or combined analog and digital lines to the I/O card 126, while the field devices 119-122 are smart devices, such as FOUNDATION® Fieldbus field devices, that communicate over a digital bus to the I/O card 128 using a FOUNDATION® Fieldbus communications protocol. In some embodiments, though, at least some of the wired field devices 115, 116 and 118-121 and/or at least some of the I/O cards 126, 128 additionally or alternatively communicate with the controller 111 using the process control data highway 110 and/or by using other suitable control system protocols (e.g., Profibus, DeviceNet, Foundation Fieldbus, ControlNet, Modbus, HART, etc.).

In FIG. 2, the wireless field devices 140-146 communicate via a wireless process control communication network 170 using a wireless protocol, such as the WirelessHART® protocol. Such wireless field devices 140-146 may directly communicate with one or more other devices or nodes of the wireless network 170 that are also configured to communicate wirelessly (using the wireless protocol or another wireless protocol, for example). To communicate with other nodes that are not configured to communicate wirelessly, the wireless field devices 140-146 may utilize a wireless gateway 135 connected to the process control data highway 110 or to another process control communications network. The wireless gateway 135 provides access to various wireless devices 140-158 of the wireless communications network 170. In particular, the wireless gateway 135 provides communicative coupling between the wireless devices 140-158, the wired devices 115-128, and/or other nodes or devices of the process control plant 100. For example, the wireless gateway 135 may provide communicative coupling by using the process control data highway 110 and/or by using one or more other communications networks of the process plant 100.

Similar to the wired field devices 115-122, the wireless field devices 140-146 of the wireless network 170 perform physical control functions within the process plant 100, e.g., opening or closing valves, or taking measurements of process parameters. The wireless field devices 140-146, however, are configured to communicate using the wireless protocol of the network 170. As such, the wireless field devices 140-146, the wireless gateway 135, and other wireless nodes 152-158 of the wireless network 170 are producers and consumers of wireless communication packets.

In some configurations of the process plant 100, the wireless network 170 includes non-wireless devices. For example, in FIG. 2, a field device 148 of FIG. 2 is a legacy 4-20 mA device and a field device 150 is a wired HART® device. To communicate within the network 170, the field devices 148 and 150 are connected to the wireless communications network 170 via a respective wireless adaptor 152A, 152B. The wireless adaptors 152A, 152B support a wireless protocol, such as WirelessHART, and may also support one or more other communication protocols such as Foundation® Fieldbus, PROFIBUS, DeviceNet, etc. Additionally, in some configurations, the wireless network 170 includes one or more network access points 155A, 155B, which may be separate physical devices in wired communication with the wireless gateway 135, or may be provided with the wireless gateway 135 as an integral device. The wireless network 170 may also include one or more routers 158 to forward packets from one wireless device to another wireless device within the wireless communications network 170. In FIG. 2, the wireless devices 140-146 and 152-158 communicate with each other and with the wireless gateway 135 over wireless links 160 of the wireless communications network 170, and/or via the process control data highway 110.

In FIG. 2, the process control system 100 includes one or more operator workstations 171 that are communicatively connected to the data highway 110. Via the operator workstations 171, operators may view and monitor run-time operations of the process plant 100, as well as take any diagnostic, corrective, maintenance, and/or other actions that may be required. At least some of the operator workstations 171 may be located at various, protected areas in or near the plant 100, e.g., in a back-end environment of the plant 100, and in some situations, at least some of the operator workstations 171 may be remotely located, but nonetheless in communicative connection with the plant 100. Operator workstations 171 may be wired or wireless computing devices.

The example process control system 100 is further illustrated as including a configuration application 172A and configuration database 172B, each of which is also communicatively connected to the data highway 110. As discussed above, various instances of the configuration application 172A may execute on one or more computing devices (not shown) to enable users to create or change process control modules and/or other types of modules, and download these modules via the data highway 110 to the controllers 111 and/or other devices of the process control system 100, as well as enable users to create or change operator interfaces via which in operator is able to view data and change data settings within process control routines. The configuration database 172B stores the created (e.g., configured) modules and/or operator interfaces. Generally, the configuration application 172A and configuration database 172B are centralized and have a unitary logical appearance to the process control system 100, although multiple instances of the configuration application 172A may execute simultaneously within the process control system 100, and the configuration database 172B may be implemented across multiple physical data storage devices. Accordingly, the configuration application 172A, configuration database 172B, and user interfaces thereto (not shown) comprise a configuration or development system 172 for control and/or display modules. Typically, but not necessarily, the user interfaces for the configuration system 172 are different than the operator workstations 171, as the user interfaces for the configuration system 172 are utilized by configuration and development engineers irrespective of whether or not the plant 100 is operating in real-time, whereas the operator workstations 171 are utilized by operators during real-time operations of the process plant 100 (also referred to interchangeably here as "run-time" operations of the process plant 100).

The example process control system 100 includes a data historian application 173A and data historian database 173B, each of which is also communicatively connected to the data highway 110. The data historian application 173A operates to collect some or all of the data provided across the data highway 110, and to historize or store the data in the historian database 173B for long term storage. Similar to the configuration application 172A and configuration database 172B, the data historian application 173A and historian database 173B are centralized and have a unitary logical appearance to the process control system 100, although multiple instances of a data historian application 173A may execute simultaneously within the process control system 100, and the data historian 173B may be implemented across multiple physical data storage devices.

In some configurations, the process control system 100 includes one or more other wireless access points 174 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 174 allow handheld or other portable computing devices (e.g., user interface devices 175) to communicate over a respective wireless process control communication network that is different from the wireless network 170 and that supports a different wireless protocol than the wireless network 170. For example, a wireless or portable user interface device 175 may be a mobile workstation or diagnostic test equipment that is utilized by an operator within the process plant 100 (e.g., an instance of one of the operator workstations 171). In some scenarios, in addition to portable computing devices, one or more process control devices (e.g., controller 111, field devices 115-122, or wireless devices 135, 140-158) also communicate using the wireless protocol supported by the access points 174.

In some configurations, the process control system 100 includes one or more gateways 176, 178 to systems that are external to the immediate process control system 100. Typically, such systems are customers or suppliers of information generated or operated on by the process control system 100. For example, the process control plant 100 may include a gateway node 176 to communicatively connect the immediate process plant 100 with another process plant. Additionally or alternatively, the process control plant 100 may include a gateway node 178 to communicatively connect the immediate process plant 100 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

It is noted that although FIG. 2 only illustrates a single controller 111 with a finite number of field devices 115-122 and 140-146, wireless gateways 35, wireless adaptors 152, access points 155, routers 1158, and wireless process control communications networks 170 included in the example process plant 100, this is only an illustrative and non-limiting embodiment. Any number of controllers 111 may be included in the process control plant or system 100, and any of the controllers 111 may communicate with any number of wired or wireless devices and networks 115-122, 140-146, 135, 152, 155, 158 and 170 to control a process in the plant 100.

As shown in FIG. 2, and simultaneously referring to FIG. 1 for clarity of illustration and not for limitation purposes, the process plant 100 is communicatively connected to an edge gateway system 102, which may be an embodiment of the edge gateway system 1 of FIG. 1. For example, the process plant 100 may communicatively connect to the field-facing component 10 of the edge gateway system 1 via one or more process plant communication networks, data networks, and/or links, either directly and/or via respective gateways of the process plant 100. For instance, the field-facing component 10 of the edge gateway system 1 may be communicatively connected to the process plant 100 via the networks 110, 170, via gateways 135, 176, 178, and/or via other networks, links, and/or gateways associated with the process plant, via which the field-facing component 10 receives or obtains data generated by various data sources 30 associated with the process plant 100.

Generally speaking, the data sources 30 and the networks/links 28 via which the edge gateway system 1 obtains process-plant related data may be at lower-numbered levels of the Purdue Model or similar security hierarchy (e.g., Level 0 through Level 2), and may include controllers, field devices, I/O cards, and other types of process control devices. Further, it is understood that the set of data sources 30 associated with the process plant is not limited to only process control devices that directly generate first-order process data, but may additionally or alternatively include any device or component within and/or associated the process plant 100 that generates process data and/or other types of data as a result of the process plant 100 controlling the on-line process. For example, the set of data sources 30 may include modules, alarms, event historians, batch systems and/or historians, diagnostic devices or components that generate diagnostic data, network routing devices or components that transmit information between various components and/or devices of the process plant 100, an asset management system, a configuration system, an analytics system, mobile devices, software defined networks, virtual networks such as virtual private networks, VLANs, and/or VXLANs, and the like. Indeed, any one or more of the components shown in FIG. 2 (e.g., components 111, 115-122, 126, 128, 135, 140-146, 152, 155, 158, 160, 170, 171-176, 178) and other components that are not shown in FIG. 2 may be a data source 30 that generates process plant-related data which may be provided for consumption by one or more external systems 8 via the edge gateway system 1, 102.

Field-Facing Component

Figure 3:
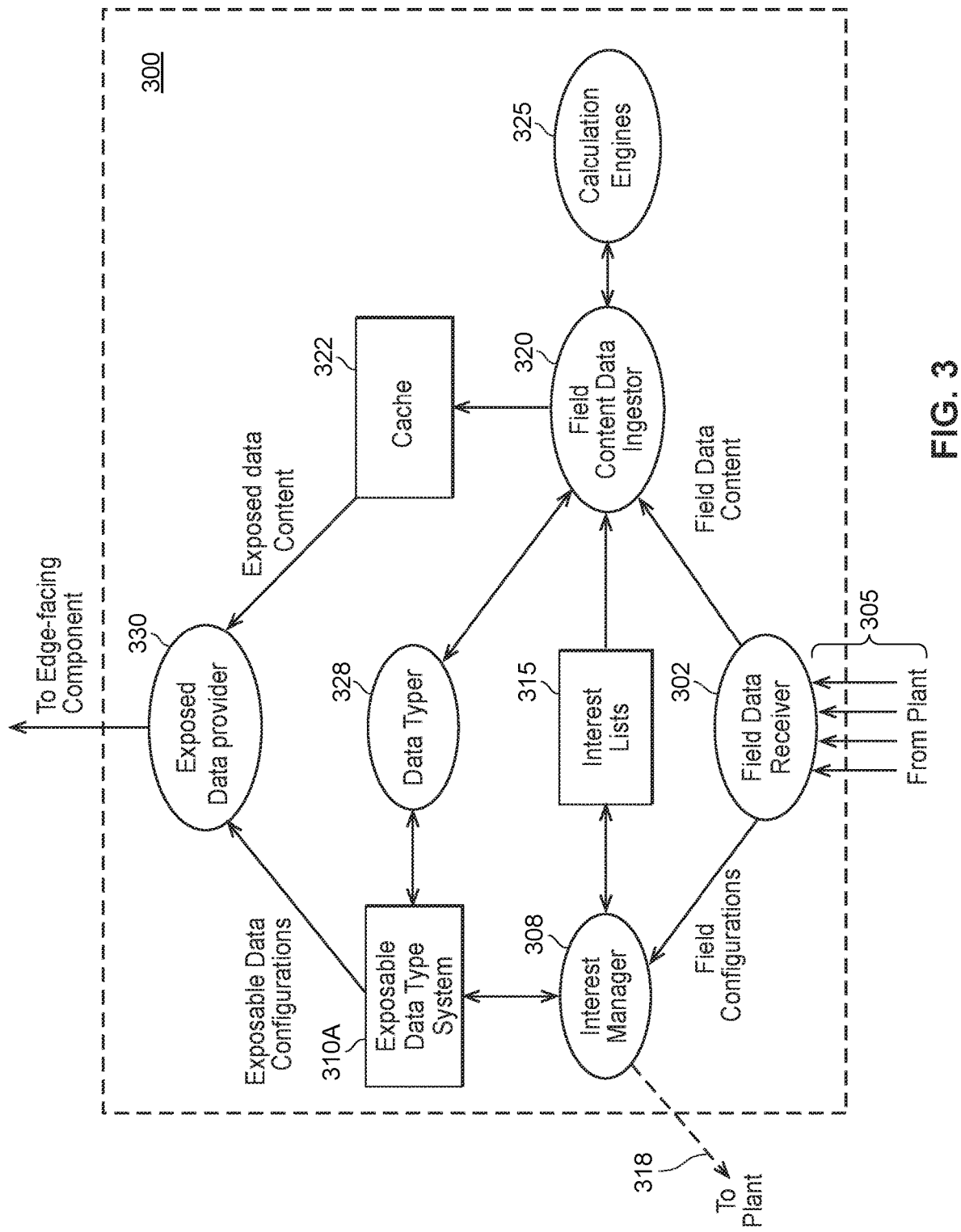
FIG. 3 is a block diagram of an example field-facing component of an edge gateway system for a process plant or process control system.

FIG. 3 is a block diagram of a field-facing component 300 which may be included an edge gateway system, such as the edge gateway system 1 or the edge gateway system 102. For example, the field-facing component 300 may be the field-facing component 10 depicted in FIG. 1, and/or may be in communicative connection with the process plant 100 of FIG. 2. For ease of illustration, and not for limitation purposes, FIG. 3 is described with simultaneous reference to FIGS. 1 and 2, although it is understood that the field-facing component 300 may be included in an edge gateway system other than the edge gateway system 1 or 102, and may be in communicative connection with process plants other than the process plant 5 or the process plant 100.

As shown in FIG. 3, a field data receiver 302 of the field-facing component 300 may be communicative connection with a process plant, such as process plant 5 or 102, and optionally with other systems, devices, and/or applications that support and/or are associated with the process plant in its run time operations, such as process control systems, safety instrumented systems, configuration systems, analytics systems, communication/networking systems, asset management systems, diagnostic and/or testing tools and/or systems, commissioning tools and/or systems, user devices and/or operator interfaces, historian systems, batch systems, software defined networks, virtual networks such as virtual private networks, VLANs, and/or VXLANs, and other systems, networks, applications, and/or devices associated with the process plant. Generally speaking, the process plant and its supporting systems to which the field-facing component 300 is communicatively connected operate at security levels 0-2 of the Purdue Model (or of a similar security hierarchy). For ease of discussion herein, and not for limitation purposes, the term "process plant 5" is used to collectively refer to the physical process plant to which the field-facing component 300 is communicatively as well as to other systems associated with and in communicative connection with the physical process plant that generate and/or communicate data at lower-numbered levels of security.

The field data receiver 302 is communicatively connected to the process plant 5 via one or more links, communication networks, and/or data networks 305 of the process plant 5, which are collectively referred to herein as "process plant networks 305." Process plant networks 305 may include any number of wired and/or wireless links and/or networks that support one or more communication protocols, data protocols, and/or industrial automation protocols, e.g., Ethernet, IP or other type of packet protocol, Wi-Fi or other IEEE 802.11 compliant wireless local area network protocol, mobile communication protocol (e.g., WiMAX, LTE, or other ITU-R compatible protocol), Bluetooth®, other standardized communication and/or data protocols (such as those governed by the Internet Engineering Task Force (IETF), the Institute of Electrical and Electronics Engineers (IEEE), or the International Organization for Standardization (ISO)), HART®, WirelessHART®, HART-IP, Profibus, FOUNDATION® Fieldbus, Field Device Integration Technology (FDI), OPC (Object linking and embedding for Process Control) UA (Unified Architecture), other types of industrial automation protocols, etc. For example, the process plant networks 305 may include the process plant networks 28, the wireless network 170, the backbone 110, and any other wired and/or wireless networks and/or links that are utilized in the process plant 5 and its associated systems, such as, for example, asset management networks, historian networks, data analytics networks, software defined networks, virtual networks such as virtual private networks, VLANs, and/or VXLANs, diagnostic and/or testing networks, configuration networks, and/or another type of network corresponding to operations, maintenance, and/or configuration of the process plant 5.

The field data receiver 302 obtains, from the process plant 5 via the process plant networks 305, one or more field configurations of the process plant 5. For example, when the process plant 5 includes a DeltaV process control system provided by Emerson Automation Solutions, the field data receiver 302 obtains one or more .FHX files in which the configuration of the process control system and its components (e.g., physical, logical, and data components) are defined, e.g., via the configuration application 172A. An interest manager 308 defines, creates, generates, and updates an exposable data type collection or system 310 based on the obtained field configurations of the process plant 5. As is described in more detail elsewhere within this disclosure, the field-facing component 300 transfers the system or collection of exposable data types 310 to its respective edge-facing component (e.g., edge-facing component 12). In an example embodiment, the exposable data type system or collection 310 is the exposable data type system 24A of FIG. 1.

Generally speaking, to define, create, generate, and update the exposable data type system 310, the interest manager 308 extracts information from the obtained field data configurations, where the extracted information is allowed to be exposed (e.g., is exposable) to external, data-consuming systems 8. Whether or not particular information included in the obtained field configurations is or is not allowed to be exposed to external systems 8 may be pre-defined, e.g., a priori by the edge gateway system, the field-facing component 300, and/or by a user via one or more interest lists 315, and/or may be indicated in-line during the extraction process, e.g., by the edge gateway system, field-facing component 300, and/or user. At any rate, the interest manager 308 defines, names, maps, converts, groups, assigns values, and/or otherwise arranges the extracted information into corresponding data types and configurations of the exposable data type system 310, e.g., by using a generally understood syntax, such as a standard syntax or an open source syntax. Accordingly, the exposable data type system 310 provides a common understanding of the types of exposable process plant-related data that are included in field content data (which may include, for example, process plant-related data types, parameter types, block types, module types, event types, history data types, equipment and equipment component types, display and display component types, and other types of process plant-related data that are generated by the process plant) by using a syntax that is natively understood by external, data-consuming systems 8.

For example, the exposable data type system 310 may include basic data types such as float, float with status, signed integer, unsigned integer, etc. and other basic data types that are natively understood by the external, data-consuming systems 8. Additionally, the exposable data type system 310 may include more complex data configuration type definitions which are defined and structured at least in part based on the basic data types, examples of which are illustrated in FIGS. 4A-4C. Some data types of the exposable data type system 310 may include multiple fields, such as depicted in FIG. 4A by the example mode type 312a which has been defined to contain four fields of type ENUM. Indeed, the exposable data type system 310 may include types that are based on multiple enumerations, which may be user-defined or system-defined. For example, as shown in FIG. 4C, a portion 312b of an example enumeration set included in the exposable data type system 310 is named and defined to indicate discrete HART states utilized in the process plant 5. FIG. 4B depicts a portion 312c of an even more complex example, in which a cause and effect matrix (CEM) function block of the process plant 5 is defined within the exposable data type system 310 by using a block type. Of course, the exposable data type system 310 may include many more exposable data type definitions and/or configurations other than the examples illustrated in FIGS. 4A-4C.

Generally, the system or collection of exposable data types 310 generated or defined by the interest manager 308 is not required to conform to the data types, configurations, hierarchies, and architecture that have been defined within the process plant 5 (although, if desired, some of the exposable data types 310 may be defined to conform, at least in part, to defined process plant data architectures and configurations). Additionally, it is understood that the generation or definition of the system or collection of exposable data types 310 is typically not a one-to-one conversion or mapping of defined process plant data types into respective, exposable data types. Rather, only process plant data types that are allowed to be exposed to external, data-consuming systems 8 are included in the collection/system 310, and such exposable process plant data types are re-configured, re-arranged, re-grouped, consolidated, distributed, abstracted, defined, and/or otherwise expressed in a comprehensive data type system 310 that is more useful and/or more easily utilized by the external systems 8, not only in syntax, but also in structure and arrangement of content.

In particular, and as mentioned above, in some embodiments the interest manager 308 extracts the exposable data type system 310 from the obtained field configurations of the process plant 5 at least partially based on one or more interest lists 315. Interest lists 315 indicate which types of process plant-related data may be exposed by the field-facing component 300 to external, data-consuming systems 8, and interest lists 315 may be defined by a user, the field-facing component 300, the edge gateway system 1, and/or by some other computing system, e.g., via an interest list configuration application provided by the field-facing component 300. For example, the field-facing component 300 may provide a web-based user interface via which a user may manually define one or more interests lists 315, e.g., by using JSON (JavaScript Object Notation) or other types of scripts or notations. Additionally or alternatively, the field-facing component 300, the edge gateway system 1, and/or some other computing system may automatically determine or define one or more interest lists 315, such as by using templates and best practices, by including commonly written and/or read data point (e.g., via mining and/or analyses of operator interface data, process historian data, event historian data, etc.), and/or by using some other suitable automated technique. In an embodiment, the set of interest lists 315 at the field-facing component 300 defines the only data of an entirety of data obtained by the field-facing component from the process plant that is allowed to be exposed by the field-facing component to the one or more external systems for consumption. Different field-facing components 300 of the process plant 5 may store different sets of interest lists 315, if desired, thus indicating the specific types of process-plant related data that the hosting field-facing component is respectively allowed to expose to the data-consuming systems 8.

An interest list may indicate names and respective groupings or arrangements of, for example, related modules, nodes, diagnostics, alarms, events, and/or other field data information, which may have been configured within the process plant 5 across multiple, and sometimes disparate, configurations. Indeed, interest lists 315 are not required to conform to configuration hierarchies and/or configuration content as defined within the process plant 5 (although, if desired, some interest lists 315 may be defined to conform, at least in part, to defined process plant configuration hierarchies and/or configuration content). Generally speaking, interests lists 315 may be defined in any manner (e.g., organizationally, hierarchically, and/or content-wise) that is useful and/or easily utilized by external systems 8 which are consumers of the exposed process plant-related data. For example, at least some interest lists 315 may be named to reflect specific plant equipment and/or devices (e.g., "Diesel-Hydro-Treater-1", "Alkylation-Unit-3", etc.), and may be defined using parameters from several different modules, nodes, diagnostics, alarms, etc. that are obtained from multiple different configurations that have been defined within the process plant 5 and relate to the specific plant equipment/devices. For instance, the field data content ingestor 320 may utilize a particular interest list 315 to extract particular field content data (e.g., control data, I/O data, diagnostic data, device data, etc.) that are collectively identified by the particular interest list 315 as representing a particular named entity (e.g., "Diesel-Hydro-Treater-1", "Alkylation-Unit-3", etc.), and may store the extracted data corresponding to the particular named entity in the cache 322 e.g., either as is and/or in a reorganized manner, such as by using the exposable data type system 310A, so that the extracted data corresponding to the particular named entity of the particular interest 315 list is exposed to external systems 8 via the edge-facing component 12.

For example, a "Spray-Tower-2" interest list may be defined to refer to a particular spray tower within the process plant 5, and may include all parameters related to "Spray-Tower-2" that are included in the field configurations of asset management systems, process control systems, safety instrumented systems, diagnostic tools, historian systems, software defined networks, virtual networks such as virtual private networks, VLANs, and/or VXLANs, etc. For example, the "Spray-Tower-2" interest list may include parameters indicative of the area in which Spray-Tower-2 is located; parameters indicative of pipes, pumps, and other vessels, lines, and other physical components devices included in Spray-Tower-2 (which may be referenced within the field configurations by device tags and other types of physical component tags or identifiers, for example); parameters indicative of logical process elements such as control loops and modules, control parameters and/or variables (such as setpoints, measurements, control signals, other signals, and the like), alarms, events, operating states or statuses, equipment or device states or statuses, time stamps, and other logical and/or data components included in and/or utilized by the Spray-Tower-2 (which may be referenced within the field configurations by control tags, device signal tags, or other types of logical component tags or identifiers, for example), etc. Further, the "Spray-Tower-2" interest list may indicate other characteristics and/or aspects of the parameters, such as respective units of measurement, respective ranges, respective target values or setpoints, respective control routines or other applications that utilize the parameters; respective usages, respective diagnostic parameters, and/or other respective characteristics and/or associated information.

In some embodiments, based on generating the interest lists 315, the interest manager 308 may determine one or more changes to one or more field configurations that are stored in the process plant 5, and may communicate the determined changes to a configuration application 172A or other process plant-related configuration application via the process plant networks 305, as denoted by reference 318.

Returning now to the field data receiver 302, in addition to field configurations, the field data receiver 302 also obtains, from the process plant 5 via the process plant networks 305, field content data that includes data that is generated by the process plant 5 while operating to control an industrial process, as well as other data related to the process plant 5 operating to control the industrial process. Generally speaking, field content data may include any type of data generated by process plant 5, e.g., that is generated by process control systems, configuration systems, analytics systems, communication/networking systems, asset management systems, diagnostic and/or testing tools and/or systems, commissioning tools and/or systems, user devices and/or operator interfaces, historian systems, batch systems, software defined networks, virtual networks such as virtual private networks, VLANs, and/or VXLANs, and other systems, networks, applications, and/or devices associated with the process plant. For example, field content data may include run-time process data, continuous process data, batch process data, batch history data, historized data, event data, alarms data, analytics data, diagnostic data, environmental data, user interface data, performance data, and/or other types of payload data generated by the data sources 30. The field data receiver 302 may receive field content data via the process plant networks 305 in any protocol that is utilized by the process plant networks 305, e.g., Ethernet, WirelessHART, HART-IP, and/or other packet protocols, streaming protocols, and the like.

A field content data ingestor 320 ingests obtained field data content based on the interest lists 315, may perform processing on at least a portion of the ingested field data content, and store the ingested field data content in a cache or other type of memory 322 of the field-facing component 300 for eventual delivery to its respective edge-facing component (e.g., the edge-facing component 12). The field content data ingestor 320, in conjunction with the field data receiver 302, may obtain field content data for ingestion in one or more different manners. For example, for field content data that is published by respective sources 30 and that is included on the interest lists 315, the field content data ingestor 320 may cause the field data receiver 302 to subscribe to the publications of such field content data, e.g., on behalf of the field-facing component 300. In another example, for some of the field content data included on the interest lists 315, the field content data ingestor 320 may initiate queries of respective data sources 30 for the field content data, e.g., via polling and/or via request/response mechanisms, e.g., in accordance with at least some of the configured or defined interest lists 312. In yet another example, for some of the field content data included on the interest lists 315, the field content data ingestor 320 may drop or filter out any field content data that is obtained at the field-facing component 300 via the field data receiver 302 and that is not indicated on the interest lists 302. In still another embodiment, instead of defining or indicating field content data that is to be exposed to external sources 8, some interest lists 315 may define or indicate which types of field content data are to be excluded from being exposed to external sources 8. If and when such non-exposable field content data are received at the field-facing component 300, the field content data ingestor 320 may drop or filter out such field content data so that the excluded field content data is not stored into the cache 322 and is prevented from being delivered to the end-facing component.

In some embodiments, interest lists 315 may indicate exposable field content data-of-interest that is not generated by process plant-related data sources 30, but is derived or generated from the field content data generated by the process plant-related data sources 30. Such second-order field content data may be determined or generated by one or more calculation engines 325 that are invoked by the field content data ingestor 320. Generally speaking, a calculation engine 325 operates on first-order field content data that is obtained via the process plant networks 308 to generate one or more outputs, where the outputs of the calculation engine 325 are defined on one or more interest lists 315 as being exposable field content data. Outputs of the calculation engines 325 may be stored in the cache 322 along with other first-order field content data for eventual delivery to the edge-facing component. Calculation engines 325 may perform computational functions, such as instream data aggregations and/or manipulations (e.g., averages, maximums, minimums, etc.). Calculation engines 325 may perform more complex calculations or algorithms, such as principal component analysis (PCA), partial least squares (PLS) predictions, and/or other types of statistical calculations or analytics. Calculation engines 325 may perform process control-specific calculations, such as function block, shadow block, and/or control module operations. At least some calculation engines 325 may be defined and/or configured by scripts and/or via a web-based user interface or other type of calculation engine configuration application provided by the field-facing component 300, and at least some calculation engines 325 may be defined and/or configured by using containers (such as Docker containers and/or other suitable types of containers) that are accessible to and/or installed at the field-facing component 300.

In addition to calculation engines 325, the field content data ingestor 320 may invoke a data typer 328 to transform at least a portion of the obtained, exposable field content data into respective exposable data types in accordance with the exposable data type system 310. That is, the data typer 328 represents exposable field content data using the names, structures, groupings, values, arrangements, etc. defined by the exposable data type system 310. The field content data ingestor 320 stores the typed, field content data into the data cache 322 as exposed field content data related to the process plant 5 for delivery to the edge-facing component.

An exposed data provider 330 of the field-facing component 300 provides exposable data configurations and exposed data content to the edge-facing component corresponding to the field-facing component 300, e.g., via a data diode 15 or via some other suitable data transport mechanism. For example, the exposed data provider 330 may send, e.g., on behalf of the field-facing component 300, exposable data configurations of the exposable data type system 310 to the edge-facing component so that the edge-facing component is able to interpret exposed data content that is sent by the field-facing component 300. Subsequently, the exposed data provider 330 may retrieve stored, exposed field data content stored in the cache 322 and send the retrieved data to the edge-facing component. The exposed data provider 330 may send the exposable data configurations and the exposed data content using a streaming protocol and/or a public or commonly used data-interchange format, such as JSON or some other standardized and/or open-sourced data-interchange format. For example, the field-facing component 300 may provide a streaming service that the exposed data provider 330 utilizes to stream data to its corresponding edge-facing component, e.g., via a respective unidirectional data diode 15. In an embodiment, the exposed data provider 330 wraps the exposable data configurations and the exposed data content in the streaming protocol which is implemented using the public or commonly used data-interchange format. In some embodiments, the exposed data provider 330 sends the exposable data configurations and the exposed data content to the edge-facing component using a proprietary or private protocol, which may be a proprietary or private streaming protocol. In some embodiments, the exposed data provider 330 encrypts the exposed data configurations and the exposed data content prior to its delivery to the edge-facing component.

In an embodiment, the exposed data provider 330 publishes the exposable data configurations and the exposed data content, e.g., across the data diode 15. The edge-facing component subscribes to the information published by the exposed data provider 330 of the field-facing component 300, thereby obtaining the exposable data configurations and the exposed data content, which may be made available at the edge-facing component to the external, data-consuming systems 8, as is described in more detail elsewhere within this disclosure.

It is noted that in FIG. 3, although the field data receiver 302, the interest manager 308, the field content data ingestor 320, the data typer 328, and the exposed data provider 330 are depicted as distinct, different components of the field-facing component 300, this is for clarity of discussion purposes only and not for limitation purposes. Indeed, any two or more of the components 302, 308, 320, 328, and 330 may be implemented as an integral component of the field-facing component 300, if desired.

Edge-Facing Component

Figure 5A:
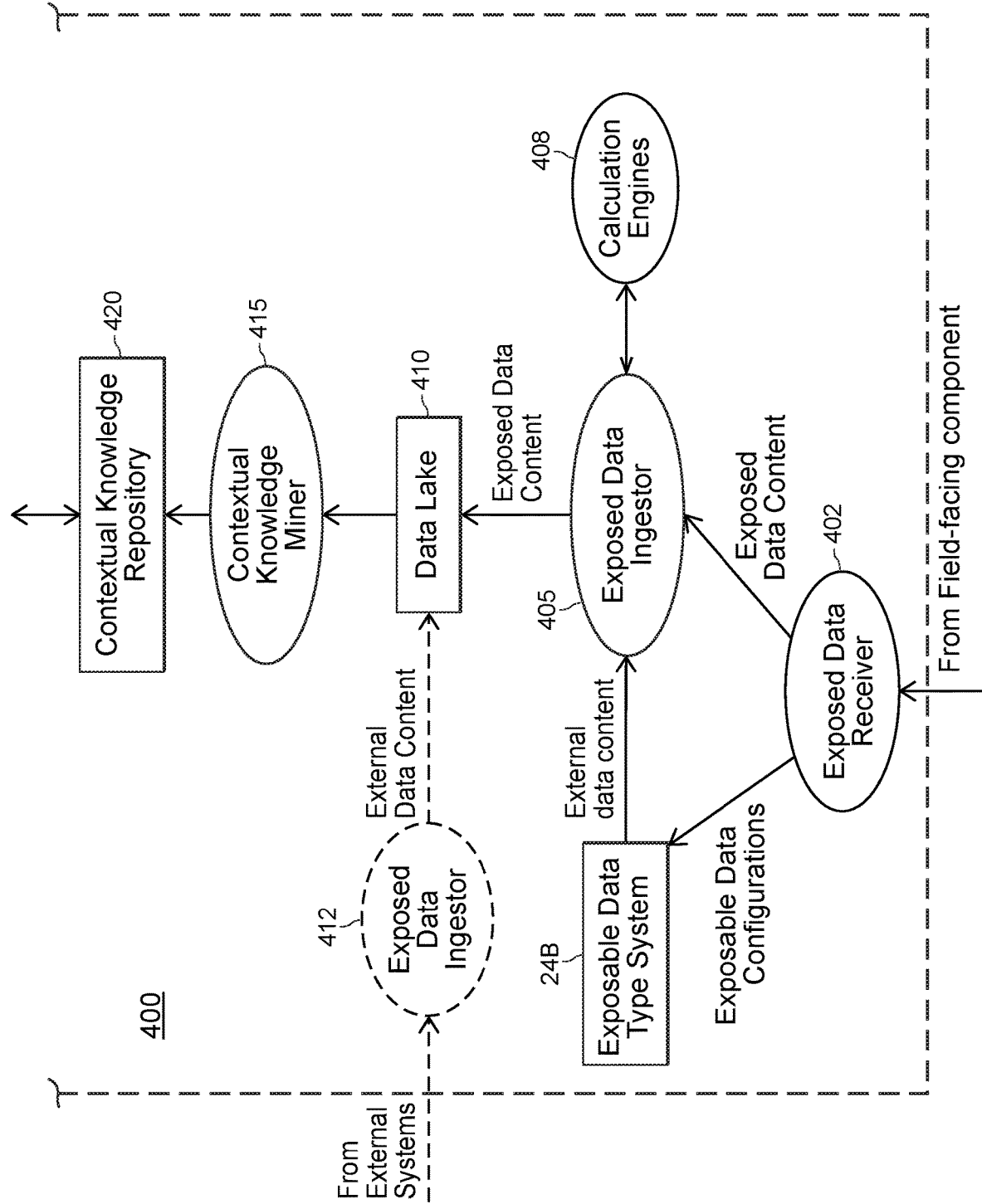
FIG. 5A is a block diagram of a first portion of an edge-facing component of an edge gateway system for a process plant or process control system.

FIGS. 5A-5B depict a block diagram of an edge-facing component 400 which may be included an edge gateway system, such as the edge gateway system 1 of FIG. 1 or the edge gateway system 102 of FIG. 2. For example, the edge-facing component 400 may be the edge-facing component 12 depicted in FIG. 1, and/or may be in communicative connection with the field-facing component 10 or 300, e.g., via the data diode 15 or another connective link, network, or medium. For ease of illustration, and not for limitation purposes, FIGS. 5A and 5B are described with simultaneous reference to FIGS. 1-3, although it is understood that the edge-facing component 400 may be included in an edge gateway system other than the edge gateway system 1 or 102, and may be in communicative connection field-facing components other than the field-facing component 10 or 300.

As shown in FIG. 5A, an exposed data receiver 402 of the edge-facing component 400 may be in communicative connection with a field-facing component that, in turn, is in communicative connection with a process plant, such as process plant 5 or 102, and optionally with other systems, devices, and/or applications that support and/or associated with the process plant in its run time operations, such as process control systems, safety instrumented systems, configuration systems, analytics systems, communication/networking systems, asset management systems, diagnostic and/or testing tools and/or systems, commissioning tools and/or systems, user devices and/or operator interfaces, historian systems, batch systems, software defined networks, virtual networks such as virtual private networks, VLANs, and/or VXLANs, and other systems, networks, applications, and/or devices associated with the process plant. Generally speaking, the process plant and its supporting systems to which the field-facing component corresponding to the edge-facing component 400 is communicatively connected operate at security levels 0-2 of the Purdue Model (or of a similar security hierarchy).

An exposed data receiver 402 of the edge-facing component 400 communicatively connects the edge-facing component 400 and the corresponding field-facing component via one or more links, communication networks, and/or data networks. In a preferred embodiment, the exposed data receiver 402 communicatively connects the edge-facing component 400 to the corresponding field-facing component via a data diode, such as the unidirectional data diode 15 depicted in FIG. 1. For ease of discussion, and not for limitation purposes, the edge-facing component 400 is described below as being communicatively connected to the field-facing component via the data diode 15, although it is understood that other communicative connections other than the data diode 15 may interconnect the edge-facing component 400 and the field-facing component. For example, in some embodiments, the edge-facing component 400 and the field-facing component may be included in an integral system or device.

The exposed data receiver 402 may receive exposed data configurations and exposed data content from the field-facing component. The exposable data configurations and the exposed data content may be received via a streaming protocol and/or via a public or commonly used data-interchange format, such as JSON or some other standardized and/or open-sourced data-interchange format. In some embodiments, the exposed data configurations and the exposed data content may have been wrapped, at the field-facing component end, in the streaming protocol, and the exposed data receiver 402 unwraps or extracts the exposed data configurations and exposed data content from the data stream. In some embodiments, the exposed data configurations and exposed data content may have been encrypted at the field-facing component end, and the exposed data receiver 402 decrypts the information received via the data stream. In some embodiments, the field-facing component publishes the exposable data configurations and the exposed data content, e.g., across the data diode 15. The edge-facing component 400 subscribes to the information published by the field-facing component, thereby obtaining the exposable data configurations and the exposed data content from the field-facing component.

The exposable data configurations received at the exposed data receiver 402 collectively define an exposable data type system (e.g., the exposable data type system 24A or 310) that has been generated by the field-facing component based on process plant-related configurations, such as in a manner described above. The exposed data receiver 402 locally stores the received, exposable data configurations in one or more memories as a local copy 24B of at least a portion of the exposable data type system 24A of the field-facing component.

The exposed data content received at the exposed data receiver 402 is represented using respective data types included in the exposable data type system 24B. The received exposed data content may include field content data generated by the process plant 5, e.g., data that is generated by process control systems, configuration systems, analytics systems, communication/networking systems, asset management systems, diagnostic and/or testing tools and/or systems, commissioning tools and/or systems, user devices and/or operator interfaces, historian systems, batch systems, software defined networks, virtual networks (e.g., virtual private networks, VLANs, VXLANs, etc.), and other systems, networks, applications, and/or devices associated with the process plant. For example, field content data may include run-time process data, continuous process data, batch process data, batch history data, historized data, event data, alarms data, analytics data, diagnostic data, environmental data, user interface data, performance data, and/or other types of payload data generated by the data sources 30. Additionally, the received exposed data content may include data that has been derived or generated from field content data by the field-facing component corresponding to the edge-facing component 400, e.g. by one or more calculation engines 325 of the field-facing component. The exposed data receiver 402 provides the received, exposed data content to an exposed data ingestor 405 of the edge-facing component 400 for interpretation, possible additional processing, and storage at the so that the exposed data content (and possible additional content) is made available for utilization by data-consuming applications and/or systems, which are represented in FIG. 5B by the blocks 422.

In particular, the exposed data ingestor 405 utilizes the local copy of the exposable data type system 24B to interpret exposed data content that is received from the field-facing component. As such, the exposed data ingestor 405 and the edge-facing component 400 do not need to be (and indeed, are not) aware of any internal or native data definitions and/or configurations of the process plant 5. That is, the edge-facing component 400 interprets received, exposed data content based on the received, exposable data configurations that have been stored into the exposable data type system 24A corresponding to the field-facing component, and the edge-facing component 400 does not need to send any communications to the field-facing component to obtain and/or coordinate data configurations. This technique protects the process plant 5 from possible security breaches as no administrative and/or control messages need to be sent from the edge-facing component to the field-facing component that is communicatively connected to the process plant 5, thereby eliminating a possible point of entry for nefarious actors. Further, this techniques allows configuration changes at the process plant 5 to be communicated to the edge-facing component 400 in-line and in real-time, and incrementally, if desired. Still further, this technique allows a single edge-facing component 400 to service multiple different field-facing components that utilize different exposable data type systems.

In some embodiments, the exposed data ingestor 405 of the edge-facing component 400 may derive and/or generate yet additional data from the received, exposed data content. For example, the exposed data receiver 402 may invoke one or more calculation engines 408 to operate on at least some of the received, exposed data content, to thereby generate additional data content that is made available to data-consuming applications and/or systems 422. Calculation engines 408 may be stored at the edge-facing component 400, and may perform computational functions, such as instream data aggregations and/or manipulations (e.g., averages, maximums, minimums, etc.) on the payload values of the data. Some calculation engines 408 may be configured to perform more complex calculations or algorithms, such as principal component analysis (PCA), partial least squares (PLS) predictions, and/or other types of statistical calculations or analytics, computing key performance indicators (KPIs), and the like, and some calculation engines 408 may be configured to drive events. At least some calculation engines 408 may be defined and/or configured by scripts and/or via a web-based user interface or other type of calculation engine configuration application provided by the edge-facing component 400, and/or at least some calculation engines 400 may be defined and/or configured by using containers that are accessible to and/or installed at the edge-facing component 400. Indeed, some calculation engines 408 may be made available for use by the data-consuming applications and/or systems 422, such as in a manner such as described elsewhere within this disclosure.

The exposed data ingestor 405 stores received, exposed data content and any outputs generated by calculation engines 408 in a data lake 410, which may be the data lake 40 of FIG. 1, for example. As the data lake 40 stores field content data that is received from the field-facing component, the data lake 40 mirrors of at least part of the entirety of data associated with the process plant 5 (e.g., run-time data, configuration data, event data, historical data, and other types of data generated by and associated with the process plant 5), where the process plant-related data stored in the data lake 40 is exposable to (e.g., made available for use by) external, data-consuming systems 8. In some process plants, all data generated by the process plant 5 is mirrored at the edge-facing component 400 and exposed to external systems 8, and in other process plants, only a subset of all data generated by the process plant 5 is mirrored at the edge-facing component 400 and exposed to data-consuming applications and/or systems 8, where the subset is defined by the collective set of interest lists 22, 315 that are resident across a set of field-facing components of the process plant 5.

As previously discussed, in some implementations, in addition to mirrored process plant-relate data, the data lake 40 stores related calculated data generated by the calculation engines 408 at the edge-facing component 400 based on the exposed content data received from the process plant 5. Further, in some embodiments, the data lake 410 also stores content data that is received, via one or more external data ingestors 412, from other external data-providing systems (e.g., systems that are external to the process plant 5 and that generate data which may be interpreted and/or analyzed in conjunction with process plant-related data, not shown in FIG. 5A) that typically are at higher-numbered levels of security than the process plant 5. Such external, data providing-systems may include, for example, enterprise-level systems such as email systems, intranet systems, site business planning and logistics systems, scheduling systems, supply chain management systems, financial systems, accounting systems, inventory management systems, other corporate systems, other IT systems, etc., and/or may include third-party provided systems such as weather forecasting systems, stock-market feeds, third-party provided OPC servers, and the like. The external data ingestors 412 may convert, modify, translate, and/or otherwise transform external data that is received from the external, data-providing systems to be in accordance with the exposable data type system 24B. Further, in some embodiments, the external data ingestors 412 may invoke one or more calculation engines 408 to operate on obtained, external data to thereby generate still additional data that is stored in the data lake 410. In some embodiments, the external data ingestors 412 may communicate with enterprise and/or third-party systems to thereby obtain and/or coordinate respective data configurations, and in some embodiments, the external data ingestors 412 may update the exposable data type system 24B to include data types corresponding to those utilized by the enterprise and/or third-party systems. However, even though the edge-facing component 400 may participate in bi-directional communications with external, data-providing systems, the process plant 5 is nonetheless protected from possible security breaches entering via the external systems, as the edge-facing component 400 still does not send (and indeed, may be physically prevented from sending) any communications to the field-facing component that is communicatively connected to the process plant 5.

At any rate, the data lake 410 stores content data that has been generated by and received from the process plant 5 via the field-facing component and, in some implementations, stores content data that has been generated by and received from one or more external, data-providing systems. In some embodiments, the data lake 410 may store additional data that has been calculated and/or derived from received content data (whether process plant-related and/or externally generated) by one or more calculation engines 408. The data stored in the data lake 410 may be stored in accordance with the exposable data type system 24B, so that the data contents may be easily consumed by the applications and/or systems 422.

The edge-facing component 400 includes a contextual knowledge miner 415 that operates on the contents of the data lake 410 to discover relationships and associations between various different data points of the data lake 410. That is, the contextual knowledge miner 415 discovers respective contexts of the data points of the data lake 410. For example, the contextual knowledge miner 415 may discover that a certain type of alarm was generated for a similar set of operating states across various different vendors' field devices of a given age that were located in a same area of the process plant, or the contextual knowledge miner 415 may discover that a key performance indicator of a particular line within a plant corresponds to a rate of change of a particular valve with respect to a rate of change of another particular valve. At any rate, the contextual knowledge miner 415 stores the discovered contexts and relationships along with the contents of the data lake 415 (collectively referred to herein as "knowledge") in a contextualized process plant knowledge repository 420, e.g., in a connected domain. For example, the contextualized process plant knowledge repository 420 may be implemented using a graph database or other suitable model in which content data and their respective interconnections are stored. For example, the a graph database node may correspond to a name or label included in the data lake 410, properties stored at the node may include respective parameters, values, states, etc., and connectors between the node and other nodes may denote interrelationships discovered by the contextual knowledge miner 415. Generally speaking, the information stored in the contextual process plant knowledge repository 420 is exposable to (e.g., available for consumption by) data-consumer applications and/or systems 422.

It is noted that in FIG. 5A, although the exposed data receiver 402, the exposed data ingest referral five, and the contextual knowledge miner 415 are depicted as distinct, different components of the edge-facing component 400, this is for clarity of discussion purposes only and not for limitation purposes. Indeed, any two or more of the components 402, 405, and 415 may be implemented as an integral component of the edge-facing component 400, if desired.

Continuing with the portion of the edge-facing component 400 depicted in FIG. 5B, the edge-facing component 400 provides a set of one or more access mechanisms 425 via which various types of data-consuming applications and/or systems 422 may access information that is stored in the contextual knowledge repository 420, either directly, or via other applications and access mechanisms. Data-consuming applications and/or systems 422 that may utilize the access mechanisms 425 provided by the edge-facing component 400 may include, for example, external applications and/or systems 8, such as enterprise applications and/or systems 422a that are associated with the enterprise that owns, operates, and/or otherwise is associated with the process plant 5 and that are at higher-numbered levels of security than the process plant 5 (e.g., email, intranet, site business planning and logistics, scheduling, supply chain management, financial, accounting, inventory management, corporate, and/or other IT applications and/or systems), and such as third-party applications and/or systems 422b that consume process plant-related knowledge (e.g., cloud computing applications/systems, external OPC servers, IoT applications/systems, IIoT applications/systems, etc.). In some arrangements, data-consuming applications and/or systems 422 may include plant-related applications and/or systems 422c, which may be at similarly-numbered levels of security as the process plant 5, or may even be systems within the process plant 5, such as process control systems, analytics systems, and the like. For example, at least some of the one or more access mechanisms 425 may be utilized by one or more applications that are specific to the process plant 5, such as a monitoring application, an analytics application, an optimization application, a virtualized device application, a process control application, an alarm management application, a device management application, a dispatching application, a low-cost sensor application, a simulation application, an operator training application, a redundancy or back-up application, a recovery application, a safety instrumented system application, a vibration monitoring application, an engineering application, an asset management application, a user interface application, or an application executing on a personal electronic device. As shown in FIG. 5B, the data-consuming applications and/or systems 422 may be communicatively connected to the edge-facing component 400 via one or more networks 423, which may public networks, private networks, wired networks, and/or wireless networks. Additionally or alternatively, at least some of the data-consuming applications 422, whether plant, enterprise, or third-party, may be installed at the edge-facing component 400, as is described in more detail below.

As illustrated in FIG. 5B, the access mechanisms 425 provided by the edge-facing component 400 includes one or more APIs 428 which serve as direct access mechanisms to information stored in the contextual knowledge repository 420. The one or more direct access APIs 428 may be implemented in accordance with, for example, the REST (REpresentational State Transfer) architecture, GraphQL or other suitable query language, and/or other standardized, open-source, interoperable data syntaxes, formats, and/or architectures that are utilized for APIs. For example, the APIs 428 may interface with C, C++, and/or C #applications, Python applications, Node.JS applications, and/or other types of applications whose languages, protocols, platforms, and frameworks are supported or provided by the edge-facing component 400, and as such, the APIs 428 may be accessed using respective bindings. Other higher-level or more removed access mechanisms may utilize the one or more direct access APIs 428 to access knowledge and information stored in the contextual knowledge repository 420.

Other access mechanisms 425 provided by the edge-facing component 400 include, for example, utilities 430, servers 432, services 435, and applications 438, to name a few. Generally, the access mechanisms 425 collectively support various types of access to the process plant-related knowledge stored in the contextual knowledge repository 420, such as request/response, publish/subscribe, event-driven access, and the like. Each of the access mechanisms 425 may utilize one or more of the direct-access APIs 422 to access information stored in the contextual knowledge repository 420. Some of the access mechanisms 425 may be exposed to external applications and/or servers 422, some of the access mechanisms may be exposed only to the process plant 5 and associated other systems at lower-numbered security levels (e.g., at the OT level), and/or some of the access mechanisms may be exposed to the edge facing component 400 itself. For example, at least one access mechanism 425 may include one or more replication mechanisms via which the data lake 410 and/or the contextual knowledge repository 420 may be replicated, e.g., for fault-tolerance, back-up, and/or redundancy purposes.

Utilities 430 which may be provided by the edge-facing component 400 include, for example, query and/or search engines, natural language processors, and/or other types of contextual utilities. Additionally or alternatively, utilities 430 may include computational utilities, such as calculations, analytics, analyses, scripts, etc. Utilities 430 may be implemented at the edge-facing component 400 using, for example, functions, algorithms, applications, etc.

Servers 432 that may be provided by the edge-facing component 400 include, for example, an OPC UA server which exposes process plant-related knowledge to data-consuming applications/systems 422 through a OPC UA data model, e.g., via respective subscriptions; a web server that hosts one or more websites and/or web applications via which data-consuming applications and/or systems 422 may interface with the edge-facing component 400 to access process plant-related knowledge stored in the contextual knowledge repository 420; and other types of servers. In some embodiments, one or more servers 432 are not exposed to external applications and systems 422, but instead are provided for use by the process plant 5 and/or lower-numbered security level systems associated with the process plant 5. For example, the edge-facing component 400 may provide an I/O server that routes data between various components of the process plant 5.

Services 435 which may be provided by the edge-facing component 400 include, for example, an AMQP (Advanced Message Queueing Protocol) queuing service (e.g., that publishes knowledge in JSON format); MQTT (Message Queuing Telemetry Transport) publication and subscription services; and/or other similarly-purposed services, systems, and/or protocols that support the transfer of process plant-related information to cloud computing applications and/or systems, IoT and/or IIoT applications and/or systems, event hubs, and/or other data-consuming applications and/or systems 422 (e.g., via publish/subscribe mechanisms and/or point-to-point mechanisms). For example, the services 435 may include OPC run-time services, which may provide a respective data source for each external OPC server (which may be a plant, enterprise, or third-party OPC server) that is a consumer of process-plant related knowledge. Further, the services 435 may include other types of services such as authentication and/or authorization services to authenticate and/or data-consuming applications and/or systems 422 (e.g., by utilizing OAuth 2 or some other suitable standard), services that interact with mobile devices, web services, knowledge or information subscription managers, and/or any other type of service which may be exposed to and/or utilized by at least some of the data-consuming applications and/or systems 422.

Additionally, the edge-facing component 400 may provide one or more applications 438 that access information stored in the contextual knowledge repository 420 and operate on the accessed information. For example, some of the utilities 430 may be implemented using applications 438, and some web services may be implemented using applications 438. At least some of the applications 438 may be provided by the enterprise, such as query engines and search engines. Some of the applications 438 may be provided by third-parties, and may be exposed to and/or utilized by at least some of the data-consuming applications and/or systems 422.

Indeed, the edge-facing component 400 may support or provide several architectural constructs, platforms, and frameworks, thereby enabling the edge-facing component 400 support or provide utilities 430, servers 432, services 435 and/or applications 438 that are generated by the enterprise associated with the process plant 5 and that are generated by third-parties. In some configurations, both enterprise-provided and third-party provided utilities 430, services 432, and/or applications 438 may be installed at the edge-facing component 400. For example, the edge-facing component may support Docker, Linux, or other types of containers in which the OPC UA server, an AMQP gateway, and various enterprise-provided access mechanisms 425 may be implemented at the edge-facing component 400, and via which third-party-provided applications may be implemented at the edge-facing component 400. Docker and/or other types of containers may utilize the direct access APIs 428 to access information stored in the contextual knowledge repository 420, for example.

Additionally or alternatively, the edge-facing component 400 may provide a Node.JS framework that supports web applications and services that are provided by the enterprise and/or by third-parties and that are installed at the edge-facing component 400. The Node.JS framework may utilize the direct access APIs 428 to access information stored in the contextual knowledge repository 420, and/or the Node.JS framework may invoke various utilities 430 (e.g., queries, searches, language processing, etc.) to access, obtain, and/or operate on information stored in the contextual knowledge repository 420.

Thus, in view of the above discussion, embodiments of the edge gateway system 1 securely connects process plants 5 and associated networks with applications that execute on plant premises as well as applications that execute remotely, such as those that are hosted in clouds and/or remote networks. Applications and/or systems that consume data generated by the process plant 5 and discovered relationships and/or knowledge included therein may securely access and obtain exposed contextual process plant knowledge with minimal to no risk to the process plant 5 itself. Moreover, the edge gateway system 1 may operate continuously in the environments that have permanent intranet connections (e.g., at security levels 3 and 4), and in environments that have public Internet connections. Various security mechanisms and features of the edge gateway system 5 (e.g., the physical separation of OT and IT networks and physical prevention of data flow into the process plant 5, secure boots and updates, the execution of signed firmware and packets, encryption, customized exposable data type systems, etc.) secure the process plant 5 and its data and provide protection against data theft and security breaches. Additionally, in embodiments, the edge gateway system 1 and/or its components utilize or incorporate one or more of the security techniques described in co-owned U.S. patent application Ser. No. 15/332,622; co-owned U.S. patent application Ser. No. 15/332,690; and co-owned U.S. patent application Ser. No. 15/332,751, the entire disclosures of which are incorporated by reference herein, thereby further securing the process plant 5 and its data, and providing further protection against data theft and security breaches.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A method of securely delivering, from a process plant via an edge gateway system, data related to the process plant for consumption by one or more external systems, the edge gateway system including a field-facing component and an edge-facing component interconnected by a data diode, and the method comprising:

sending, by the field-facing component to the edge-facing component via the data diode, a collection of data types corresponding to data that is related to an industrial process being controlled by the process plant and that is allowed to be exposed to the one or more external systems, the data diode being a unidirectional data diode configured to prevent any flow of both signaling and payload data from the edge-facing component to the field-facing component, the collection of data types defined based on one or more configurations of the process plant and represented using a syntax that is native to the one or more external systems; and streaming, by the field-facing component across the data diode to the edge-facing component, content data generated by the process plant, the content data indicated by one or more interest lists corresponding to the field-facing component, the one or more interest lists indicating the only data of an entirety of data obtained by the field-facing component from the process plant that is allowed to be exposed by the field-facing component to the one or more external systems for consumption, and each interest list of the one or more interest lists indicating respective data that is allowed to be exposed by the field-facing component to the one or more external systems for consumption, the respective exposable data indicated by the each interest list corresponds to respective data content generated by a respective one or more devices of the process plant while the process plant is operating to control the industrial process, the respective data content includes at least one of: a respective operating state, a respective time corresponding to the respective data content, a respective parameter value, a respective source of the respective data content, a respective recipient of the respective data content, or other data corresponding to the respective data content, and the content data expressed within the stream using the collection of data types, thereby making the streamed content data generated by the process plant available for consumption by the one or more external systems via the edge-facing component.

2. The method of claim 1, further comprising defining, by the field-facing component, the collection of data types based on the one or more configurations of the process plant and optionally based on the one or more interest lists.

3. The method of claim 2, wherein defining the collection of data types from the one or more configurations of the process plant comprises extracting the collection of data types from the one or more configurations of the process plant.

4. The method of claim 2, wherein defining the collection of data types is based on both the one or more configurations of the process plant and the one or more interest lists.

5. The method of claim 1, wherein sending the collection of data types comprises sending a collection of data types including at least one of: a float data type, a float with status data type, a signed integer type, an unsigned integer type, a mode data type, an enumeration data type, or a function block data type.

6. The method of claim 1, wherein sending, to the edge-facing component, the collection of data types comprises sending, to the edge-facing component, at least one data type that includes a respective plurality of fields, each field of the respective plurality of fields having a respective data type.

7. The method of claim 1, wherein sending, to the edge-facing component, the collection of data types comprises sending, to the edge-facing component, a definition of a set, the set definition indicating a name of the set and a respective name of each value of a plurality of values of a particular data type.

8. The method of claim 1, wherein streaming the content data generated by the process plant and indicated by the one or more interest lists comprises streaming content data generated by and/or corresponding to at least one of: a process parameter, a function block, a module, an event, historized data, a piece of equipment, a device, a display view, or one or more other physical and/or logical components of the process plant.

9. The method of claim 1, wherein sending, to the edge-facing component, the collection of data types includes sending, to the edge-facing component, at least one of: a user-defined data type or a system-defined data type.

10. The method of claim 1, wherein sending the collection of data types to the edge-facing component via the data diode comprises sending the collection of data types to the edge-facing component via the data diode using a public data-interchange format.

11. The method of claim 10, wherein sending the collection of data types to the edge-facing component via the data diode using the public data-interchange format comprises sending the collection of data types using a JSON (JavaScript Object Notation) format.

12. The method of claim 1, further comprising providing, by the field-facing component, one or more interfaces via which the one or more interest lists are configured.

13. The method of claim 1, wherein sending the collection of data types via the unidirectional data diode configured to prevent any flow of both signaling and payload data from the edge-facing component to the field-facing component comprises sending the collection of data types via an optical link, an Ethernet link, a wireless data diode, or a software-defined data diode.

14. The method of claim 1, wherein at least one of:
(i) the method further includes encrypting the collection of data types, and wherein sending the collection of data types to the edge-facing component includes sending the encrypted collection of data types to the edge-facing component; or
(ii) the method further includes encrypting the content data generated by the process plant, and wherein streaming the content data generated by the process plant comprises streaming the encrypted content data generated by the process plant.

15. The method of claim 1, wherein:
the method further comprises publishing, by the field-facing component, the content data generated by the process plant;
the edge-facing component subscribes to the published content data generated by the process plant; and
streaming the content data generated by the process plant comprises streaming the published content data generated by the process plant.

16. The method of claim 1, further comprising scaling the data diode based on respective sizes of the one or more interest lists.

17. The method of claim 16, wherein scaling the data diode includes adjusting at least one of a number of cores or a number of threads that are used to stream the content data generated by the process plant and the respective contexts of the content data.

18. The method of claim 1, wherein streaming the content data expressed using the collection of data types comprises wrapping, in a streaming protocol, the content data expressed using the collection of data types.

19. The method of claim 1, further comprising obtaining, at the field-facing component from the process plant, the content data generated by the process plant via one or more process plant networks supporting one or more digital automation formats and/or protocols selected from: Remote I/O, Fieldbus, HART, WirelessHART, HART-IP, Field Device Integration Technology (FDI), OPC UA, or Profibus.

20. The method of claim 1, wherein streaming the content data across the data diode comprises streaming the content data across a data diode configured to support a streaming rate of at least 100,000 process plant parameters per second.

21. The method of claim 1, wherein streaming the content data across the data diode comprises streaming the content data across a data diode configured to support a data transmission rate of at least 1 Gigabit per second.

22. The method of claim 1, wherein streaming the content data generated by the process plant includes streaming at least one of: run-time process data, continuous process data, batch process data, batch history data, historized data, event data, alarms data, analytics data, diagnostic data, environmental data, user interface data, performance data, or another type of data corresponding to at least one device of the process plant operating to control the industrial process.

* * * * *